US012694318B2

(12) United States Patent　　　(10) Patent No.: US 12,694,318 B2

Ishiguro et al.　　　(45) Date of Patent: Jul. 28, 2026

(54) QUANTUM CIRCUIT, QUANTUM COMPUTER, AND METHOD OF MANUFACTURING QUANTUM CIRCUIT

(71) Applicant: FUJITSU LIMITED, Kawasaki (JP)

(72) Inventors: Tetsuro Ishiguro, Kawasaki (JP); Kenichi Kawaguchi, Ebina (JP); Toshiyuki Miyazawa, Kawasaki (JP); Toshiki Iwai, Atsugi (JP); Tetsuya Miyatake, Isehara (JP); Yoshiyasu Doi, Yokohama (JP); Shintaro Sato, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 730 days.

(21) Appl. No.: 18/183,481

(22) Filed: Mar. 14, 2023

(65) Prior Publication Data

US 2023/0222375 A1　　　Jul. 13, 2023

Related U.S. Application Data

(63) Continuation of application No. PCT/JP2020/037255, filed on Sep. 30, 2020.

(51) Int. Cl.
　　*G06N 10/40* 　　　(2022.01)
(52) U.S. Cl.
　　CPC ................................... *G06N 10/40* (2022.01)
(58) Field of Classification Search
　　USPC ........................................................ 716/100
　　See application file for complete search history.

(56) References Cited

U.S. PATENT DOCUMENTS 8,213,751 B1 * 7/2012 Ho ........................... G02F 1/035
　　　　　　　　　　　　　　　　　　　　385/11
9,335,606 B2 * 5/2016 Hanson .................. B82Y 20/00
　　　　　　　　(Continued)

FOREIGN PATENT DOCUMENTS

JP　　　2015-504592 A　　2/2015
JP　　　2018-064087 A　　4/2018
　　　　　　(Continued)

OTHER PUBLICATIONS

Jerry M. Chow et al, "Implementing a Strand of a Scalable Fault-tolerant Quantum Computing Fabric", Nature Communications, vol. 508, pp. 1-9, DOI: 10.1038/ncomms5015, Jun. 24, 2014 (Total 9 pages) [online] https://www.nature.com/ncomms/.
　　　　　　(Continued)

*Primary Examiner* — Mohammed Alam
(74) *Attorney, Agent, or Firm* — Fujitsu Intellectual Property Center

(57)　　　　　ABSTRACT

A quantum circuit includes a plurality of first optical waveguides and a plurality of second optical waveguides formed on a substrate and each of which includes a single-photon source; a first multiplexer formed on the substrate and configured to condense first photons propagated through the plurality of first optical waveguides; a second multiplexer formed on the substrate and configured to condense second photons propagated through the plurality of second optical waveguides; a branching element configured to introduce the first photons condensed by the first multiplexer and the second photons condensed by the second multiplexer and branch the first photons and the second photons in a first direction and a second direction; a first detector configured to detect the first photons and the second photons branched in the first direction; and a second detector configured to
　　　　　　(Continued)

detect the first photons and the second photons branched in the second direction.

13 Claims, 24 Drawing Sheets

(56) References Cited

U.S. PATENT DOCUMENTS

| | | | | |
|---|---|---|---|---|
| 11,320,588 | B1 * | 5/2022 | Mazed | G02B 6/122 |
| 2008/0063339 | A1 * | 3/2008 | Spillane | G02F 1/01708 |
| | | | | 385/14 |
| 2018/0108804 | A1 * | 4/2018 | Ellis | H10H 20/81 |
| 2018/0114138 | A1 * | 4/2018 | Monroe | G06N 10/70 |

FOREIGN PATENT DOCUMENTS

| | | | | |
|---|---|---|---|---|
| WO | 2013/053911 | A1 | 4/2013 | |
| WO | 2020-180391 | A1 | 9/2020 | |
| WO | WO-2022070341 | A1 * | 4/2022 | G06N 10/40 |

OTHER PUBLICATIONS

"IBM is Building the First Universal Quantum Computer for Business and Science", IBM Japan Newsroom, [online], IBM, Mar. 6, 2017, [searched on Mar. 7, 2023] (Total 9 pages) [online] https://jp.newsroom.ibm.com/2017-03-06-IBM-Building-First-Universal-Quantum-Computers-for-Business-and-Science.

Frank Arute et al, "Quantum Supremacy Using a Programmable Superconducting Processor", Nature, vol. 574, pp. 505-510, Oct. 24, 2019 (Total 7 pages) [online] https://doi.org/10.1038/s41586-019-1666-5.

Strategic Proposal "Quantum Computer Science for All—Towards Novel Quantum Applications-", Systems and Information Science and Technology Unit, Center for Research and Development Strategy (CRDS), Japan Science and Technology Agency (JST), CRDS-FY2018-SP-04, Dec. 2018, ISBN 978-4-88890-616-6, pp. 1-56 (2.1.4. in pp. 21-22) (Total 69 pages) [online] http://www.jst.go.jp/crds.

Y. Doi et al., "Deterministic Electrical Charge-State Initialization of Single Nitrogen-Vacancy Center in Diamond", The American Physical Society, Physical Review X 4, 011057, pp. 1-11, DOI: DOI: 10.1103/PhysRevX.4.011057, Mar. 31, 2014 (Total 11 pages).

Donggyu Kim et al, "CMOS-Integrated Diamond Nitrogen-Vacancy Quantum Sensor", Nature Electronics, vol. 2, pp. 1-7, arXiv:1810.01056v1 [physics.app-ph], Oct. 2, 2018 (Total 7 pages).

John F. Barry et al, "Sensitivity Optimization for NV-Diamond Magnetometry", American Physical Society, Reviews of Modern Physics, vol. 92, No. 1, pp. 1-68, DOI: 10.1103/RevModPhys.92.015004, arXiv:1903.08176v2, Jan.-Mar. 31, 2020 (Total 68 pages).

Marcus W. Doherty et al, "The Nitrogen-Vacancy Colour Centre in Diamond", Elsevier, Physics Reports 528 (2013), arXiv:1905.02094v2, pp. 1-45, Feb. 26, 2013 (Total 45 pages) [online] http://dx.doi.org/10.1016/j.physrep.2013.02.001.

R. J. Epstein et al, "Anisotropic Interactions of a Single Spin and Dark-spin Spectroscopy in Diamond", Letters, Nature Physics, vol. 1, pp. 94-98, DOI:10.1038/nphys141, Nov. 2005 (Total 5 pages) [online] www.nature.com/naturephysics.

International Search Report and Written Opinion of the International Searching Authority (Form PCT/ISA/210, 220, and 237), mailed in connection with PCT/JP2020/037255 and mailed Nov. 10, 2020 (Total 10 pages).

Smit, Meint K. et al., "PHASAR-Based WDM-Devices: Principles, Design and Applications", IEEE Journal of Selected Topics in Quantum Electronics, IEEE, USA, vol. 2, No. 2, Jun. 1996, XP011062083, pp. 236-250.

Kiyat, Isa, "Silicon-On-Insulator Optical Waveguides and Waveguide Devices", Sep. 2000, pp. 1-113, XP093090883, Retrieved from the Internet: URL:https://core.ac.uk/download/pdf/52928668.pdf,[retrieved on Oct. 12, 2023].

Stoneham, Marshall, "Is a room-temperature, solid-state quantum computer mere fantasy?", Physics, [Online] vol. 2, No. 34, Apr. 27, 2009, XP093090144, Published Apr. 27, 2009, Retrieved from the Internet: URL:https://physics.aps.org/articles/pdf/10.1103/Physics.2.34, [retrieved on Oct. 10, 2023].

Extended European Search Report dated Oct. 24, 2023 for corresponding European Patent Application No. 20956269.3, 11 pages.

* cited by examiner

QUANTUM CIRCUIT, QUANTUM COMPUTER, AND METHOD OF MANUFACTURING QUANTUM CIRCUIT

CROSS-REFERENCE TO RELATED APPLICATION

This application is a continuation application of International Application PCT/JP2020/037255 filed on Sep. 30, 2020 and designated the U.S., the entire contents of which are incorporated herein by reference.

FIELD

The present invention relates to a quantum circuit, a quantum computer, and a method of manufacturing a quantum circuit.

BACKGROUND

In recent years, European and American information and communication technology (ICT) companies have been actively engaged in research and development of general-purpose quantum computers that can be used for various computational purposes. In 2014, a research group led by Martinis et al. at University of California, Santa Barbara (UCSB) established that high-fidelity gate operations and measurements were possible on a superconducting 5-qubit quantum computer (for example, See Non-Patent Document 1). After the research, there were reports of the start of commercial services using superconducting quantum computers and demonstration of quantum supremacy (for example, see Non-Patent Documents 2 and 3), and there are growing expectations for practical use of general-purpose quantum computers worldwide.

However, from the results of previous research on computational algorithms for general-purpose computation, it is considered that 10,000 to 100,000,000 qubits are required to realize an error-tolerant quantum computer that can ensure the reliability of quantum chemical computations, quantum simulations, and computational results (for example, see Non-Patent Document 4). Considering that the current situation is about several tens of qubits, this is a significant expansion. A current mainstream superconducting method is poor in integration due to use of a huge cooling device (cryostat) using a $^3$He—$^4$He dilution refrigerator to cool a device, even on a scale of at most 50 qubits. Moreover, a coherence time, which is a parameter that determines the number of operations per unit time of a system, is subject to physical constraints such as the order of µs, which is short. Furthermore, in a superconducting quantum computer, one qubit can only form entanglement (a bonded state between bits essential for quantum calculation) with four adjacent qubits (for example, see Non-Patent Document 3). Considering that the number of nodes that can form entanglement is a parameter that is directly linked to the computational performance of a quantum computer, this method lacks scalability.

By the way, there is a diamond color center as one of quantum elements (hereinafter simply referred to as a color center). The color center is a type of complex defect that is formed with formation of vacancies when carbon (C) atoms that make up a base material are replaced by impurity atoms such as nitrogen (N) and silicon (Si) and its electronic system has spin (see, for example, Non-Patent Documents 5 and 6). The color center has a long coherence time on the order of milliseconds, reflecting strong bonds between the carbon atoms that make up diamond, even though it is a solid system. Moreover, the color center can be a single-photon source that can operate at room temperature using coherent control (quantum state control) of its electronic levels by microwaves and an optical transition process between the levels. Therefore, it is known that an electronic spin state can be read via photons by injecting resonant light with energy equal to the energy between the levels of the color center (see, for example, Non-Patent Document 7).

Moreover, a ground state of the diamond color center is split into a fine structure due to crystal field interaction, interaction with an external magnetic field (called Zeeman effect), and interaction with atoms having nuclear spin such as $^{14}$N and $^{13}$C (hyperfine interaction) (see, for example, Patent Document 2 and Non-Patent Document 8). Therefore, the color center can transfer its own electronic spin state to nuclear spin via the hyperfine interaction. In general, electrons (spins) are disturbed by interactions with the environment, such as lattices, atoms with spins, and crystal defects, but the nuclear spin has a weak interaction with the environment and has resistance to disturbance, and thus has a coherence time on a min order. A spin system of the color center including the nuclear spin has high potential as a quantum register or qubit.

Patent Document 1: U.S. Patent Application Publication No. 2018/0114138, Patent Document 2: Japanese National Publication of International Patent Application No. 2015-504592, Non-Patent Document 1: Jerry M. Chow et al, "Implementing a strand of a scalable fault-tolerant quantum computing fabric", (USA), Jun. 24, 2014, Non-Patent Document 2: "IBM is building the first universal quantum computer for business and science", [online], Mar. 6, 2017, IBM, [searched on Mar. 7, 2023], the Internet <URL: jp.newsroom.ibm.com/2017-03-06-IBM-Building-First-Universal-Quantum-Computers-for-Business-and-Science>, Non-Patent Document 3: Frank Arute et al, "Quantum supremacy using a programmable superconducting processor", (USA), Oct. 23, 2019, Non-Patent Document 4: "Strategic Proposal Quantum Computer Science for All—Towards novel quantum applications—", Center for Research and Development Strategy, December 2018, CRDS-FY2018-SP-04, p. 21-22, Non-Patent Document 5: Physical Review X, (USA), Mar. 31, 2014, 4, 011057, Non-Patent Document 6: Donggyu Kim et al, "CMOS-Integrated Diamond Nitrogen-Vacancy Quantum Sensor", (USA), Oct. 2, 2018, Non-Patent Document 7: John F. Barry et al, "Sensitivity Optimization for NV-Diamond Magnetometry", (USA), arXiv: 1903.08176v2, Mar. 31, 2020, Non-Patent Document 8: Marcus W. Doherty et al, "The nitrogen-vacancy colour centre in diamond", (USA), arXiv:1905.02094v2, Feb. 15, 2013, and Non-Patent Document 9: Nature Physics, (USA), November, 2005, Vol. 1, p. 94-98.

SUMMARY

According to an aspect of the embodiments, a quantum circuit includes a plurality of first optical waveguides formed on a substrate and each of which includes a single-photon source; a plurality of second optical waveguides formed on a substrate and each of which includes a single-photon source; a first multiplexer formed on the substrate and configured to condense first photons propagated through the plurality of first optical waveguides; a second multiplexer formed on the substrate and configured to condense second photons propagated through the plurality of second optical waveguides; a branching element configured to introduce the first photons condensed by the first multiplexer and the second photons condensed by the second multiplexer and branch the first photons and the second photons in a first direction and a second direction; a first detector configured to detect the first photons and the second photons branched in the first direction; and a second detector configured to detect the first photons and the second photons branched in the second direction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 24 is a diagram illustrating an example of a quantum circuit according to a third embodiment;

DESCRIPTION OF EMBODIMENTS

Single photons emitted from the single-photon source including the color center or the like suffer a loss in a propagation space. Therefore, it has been difficult to scale up spatial arrangement of the single-photon source while ensuring high detection efficiency in a free-space optical system.

In one aspect, an object of the present invention is to provide a quantum circuit, a quantum computer, and a method of manufacturing a quantum circuit that enable a large-scale quantum computer.

In one aspect, the present invention enables provision of a large-scale quantum computer.

The above-described object and other objects, features, and advantages of the present invention will become clear from the following description related to the accompanying drawings, which illustrate favorable embodiments as examples of the present invention.

Hereinafter, modes for carrying out the invention will be described with reference to the drawings.

First Embodiment

Figure 1:
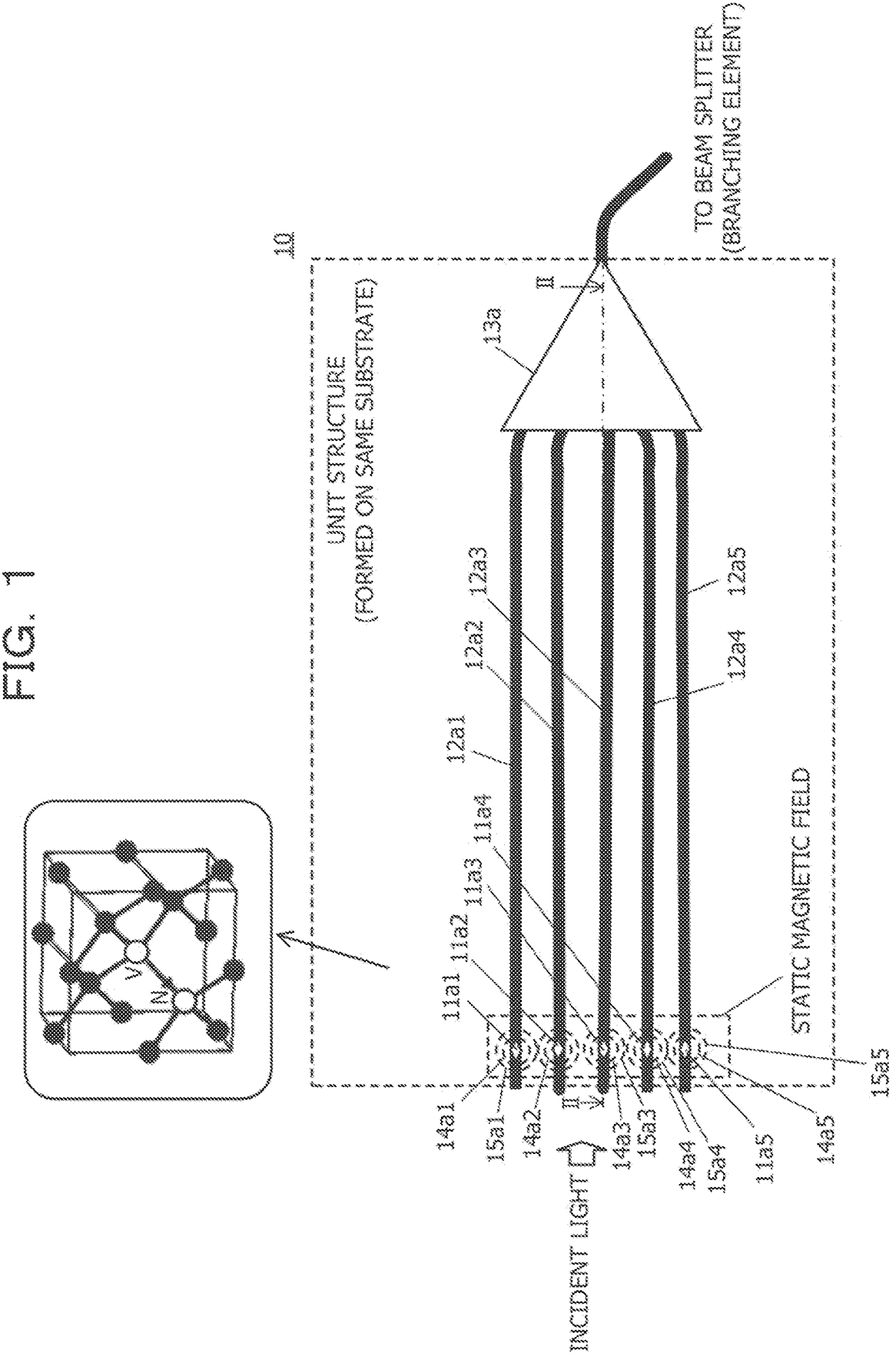
FIG. 1 is a top view illustrating an example of a unit structure of a quantum circuit according to a first embodiment.

FIG. 1 is a top view illustrating an example of a unit structure of a quantum circuit according to a first embodiment.

The unit structure of a quantum circuit 10 includes a plurality of optical waveguides 12a1, 12a2, 12a3, 12a4, and 12a5 formed in an array and each including a single-photon source (one of single-photon sources 11a1, 11a2, 11a3, 11a4, and 11a5 in FIG. 1) and a multiplexer 13a. These elements are formed on the same substrate. Note that the number of optical waveguides is not limited to five, and may be six or more.

Hereinafter, description will be given on the assumption that the single-photon source includes the above-described color center, but the single-photon source is not limited to one including the color center, and other single-photon sources can be used. Other single-photon sources include, for example, a single-photon source including semiconductor quantum dots.

The color center is a kind of complex defect formed by an impurity atom and a vacancy adjacent to the impurity atom in a diamond single crystal. The impurity atom is at least one of nitrogen (N), silicon (Si), germanium (Ge), tin (Sn) or lead (Pb). FIG. 1 illustrates an example of the color center using nitrogen (hereinafter referred to as an NV center). V represents a vacancy and a black circle represents a carbon atom.

As the optical waveguides 12a1 to 12a5, for example, thin wire waveguides using aluminum nitride (AlN) or the like and having low propagation loss can be used.

The multiplexer 13a collects photons propagated through the optical waveguides 12a1 to 12a5. A specific example of the multiplexer 13a will be described below, but the multiplexer 13a can also be configured to reduce propagation loss.

Furthermore, in the example of FIG. 1, the quantum circuit 10 has MW pulse signal generators 14a1, 14a2, 14a3, 14a4, and 14a5 that individually provide microwave pulse signals to the respective single-photon sources 11a1 to 11a5. The microwave pulse signal is used to operate an electronic spin state of a complex defect (color center) that functions as a qubit.

Moreover, in the example of FIG. 1, the quantum circuit 10 has magnetic field generators 15a1, 15a2, 15a3, 15a4, and 15a5 that individually apply static magnetic fields to the respective single-photon sources 11a1 to 11a5. The static magnetic field causes Zeeman splitting, which will be described below. Note that the magnetic field generators do not have to be individually provided for the single-photon sources 11a1 to 11a5 as long as the single-photon source can form the color center with uniform Zeeman splitting widths of a ground level and an excitation level, and the magnetic field generator may apply a uniform static magnetic field as a whole.

The MW pulse signal generators 14a1 to 14a5 and the magnetic field generators 15a1 to 15a5 are arranged below the single-photon sources 11a1 to 11a5.

Figure 2:
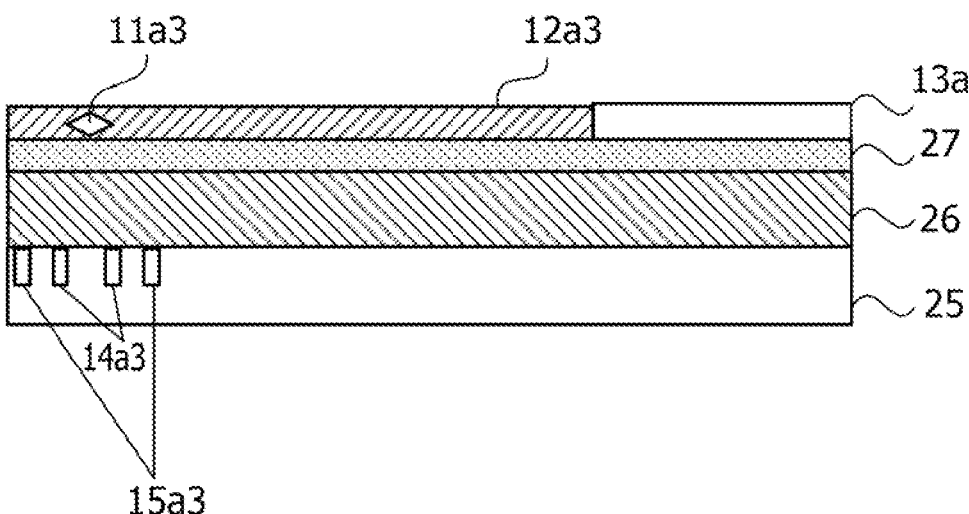
FIG. 2 is a cross-sectional view taken along line II-II of FIG. 1.

FIG. 2 is a cross-sectional view taken along line II-II of FIG. 1.

FIG. 2 illustrates schematic shapes of the MW pulse signal generator 14a3, which is one of the MW pulse signal generators 14a1 to 14a5, and the magnetic field generator 15a3, which is one of the magnetic field generators 15a1 to 15a5. The MW pulse signal generator 14a3 and the magnetic field generator 15a3 have a loop shape and are formed in a layer 25.

A semiconductor substrate 26 (for example, a silicon substrate) is provided on the layer 25, and the optical waveguide 12a3 including the single-photon source 11a3 and the multiplexer 13a are provided on the semiconductor substrate 26 via an insulating layer 27 (for example, a silicon oxide film). The insulating layer 27 is formed to enhance adhesion of the optical waveguide 12a3 and the multiplexer 13a.

Figure 3:
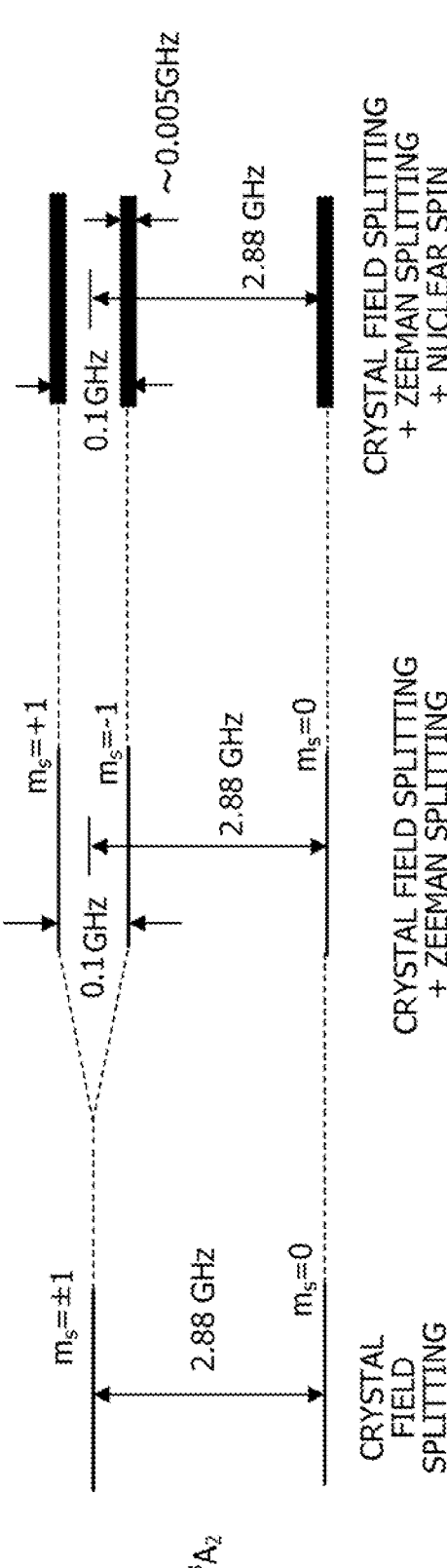
FIG. 3 is a diagram illustrating an example of change in a quantum level at an NV center.

FIG. 3 is a diagram illustrating an example of change in a quantum level at an NV center.

The NV center has s (spin quantum number)=1, and has a ground triplet state $^3A_2$ including a level of $m_s$ (magnetic quantum number)=0 and two ground levels at which levels of $m_s$=±1 are degenerated, as illustrated in FIG. 3, due to crystal field splitting even in a case where no static magnetic field is applied. A frequency corresponding to energy between the two levels is about 2.88 GHz. In this state, in a case where the static magnetic field is applied in an axial direction of the NV center, the level degeneracy of $m_s$=±1 is resolved by Zeeman splitting, and the ground level becomes three levels. The frequency corresponding to the energy between the level of $m_s$=+1 and the level of $m_s$=−1 is about 0.1 GHz. Furthermore, at the NV center, each of the three levels is split into finer levels by interactions with atoms having nuclear spins such as $^{14}N$ and $^{13}C$. That is, even finer levels are formed as the electronic spin state and the nuclear spin state are coupled with each other. The frequency corresponding to the energy of the level width where each of the three levels is split is about 0.005 GHz or less.

Note that although the change in the ground level has been given in the above description, a similar change is exhibited in an excited state.

Figure 4:
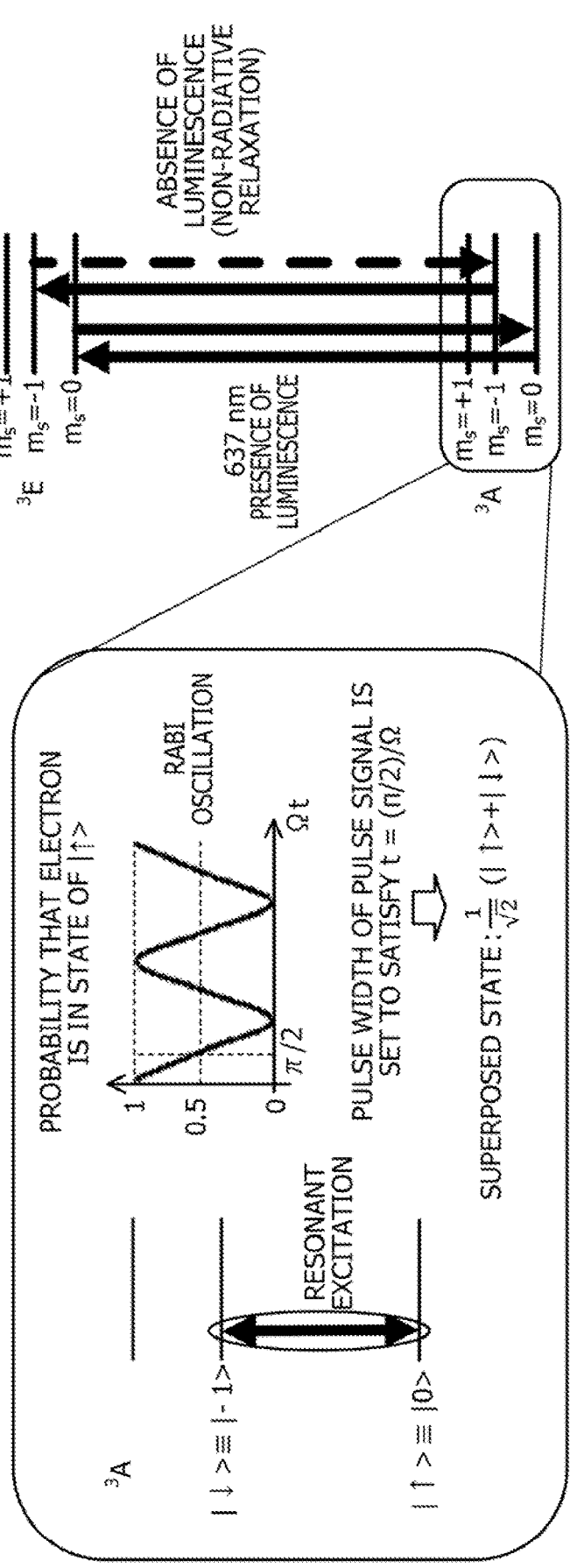
FIG. 4 is a diagram illustrating an example of operation of an electronic spin state at the NV center and a method of reading the state.

FIG. 4 is a diagram illustrating an example of operation of the electronic spin state at the NV center and a method of reading the state. FIG. 4 illustrates the ground state ($^3A$) and the excited state ($^3E$) at the NV center after application of the static magnetic field. Note that, in both $^3A$ and $^3E$ of FIG. 4, the fine levels generated by interactions with nuclear spins are respectively collectively indicated by single lines for the three levels of $m_s$=0 and ±1.

The NV center contains, among the plurality of quantum levels in the electronic spin state and the nuclear spin state, two levels of two series having an energy difference between the levels is smaller than an energy line width of a laser to be emitted to the NV center, and the levels are close to an extent that the levels are able to be resonantly excited by the laser.

In the present embodiment, the lowest ground level (the level of the state $|\uparrow\rangle\equiv|0\rangle$) that is the level of $m_s$=0 and the second ground level (the level of the state $|\downarrow\rangle\equiv|-1\rangle$) that is the level of $m_s$=−1, which are the above-described two levels, are used as the levels of two states of the qubit. Note that it is also possible to use the lowest ground level that is the level of $m_s$=0 and the first ground level that is the level of $m_s$=+1 as the levels of two states of the qubit.

Furthermore, FIG. 4 illustrates a graph illustrating Rabi oscillation. The horizontal axis represents $\Omega t$ ($\Omega$ is the frequency of the Rabi oscillation and t is a time), and the vertical axis represents a probability that an electron is in the $|\uparrow\rangle$ state.

For example, a microwave pulse signal whose pulse width satisfies $t=(\pi/2)/\Omega$ is applied to a certain NV center, and resonant excitation is performed between two levels $|\uparrow\rangle$ and $|\downarrow\rangle$, so that a superposed state $(1/\sqrt{2})(|\uparrow\rangle+|\downarrow\rangle)$ of $|\uparrow\rangle$ and $|\downarrow\rangle$ can be obtained. This operation corresponds to Hadamard transform, which is one of quantum gate operations.

The MW pulse signal generators 14a1 to 14a5 illustrated in FIG. 1 are used to, for example, operate the electronic spin states as described above for the respective single-photon sources 11a1 to 11a5.

The state obtained by operating the electronic spin state as described above can be read according to the presence or absence of luminescence produced by applying an optical pulse (laser) with energy equal to the energy difference between the ground and excitation levels ($^3E-^3A$) to the NV center. In the case of the NV center, the wavelength corresponding to the above energy difference is 637 nm.

In the case where the electron at the NV center is in the $|\downarrow\rangle$ state (at the level of $m_s$=0), luminescence (relaxation luminescence) occurs when the optical pulse with energy equal to the above energy difference is given to the NV center. Meanwhile, in a case where the electron at the NV center is in the $|\downarrow\rangle$ state (in the level of $m_s$=−1), non-radiative relaxation without luminescence occurs when the optical pulse with energy equal to the above energy difference is given to the NV center. The presence or absence of luminescence (the presence or absence of photons) is detected by a detector to be described below via the optical waveguides 12a1 to 12a5, the multiplexer 13a, and the like.

Figure 5:
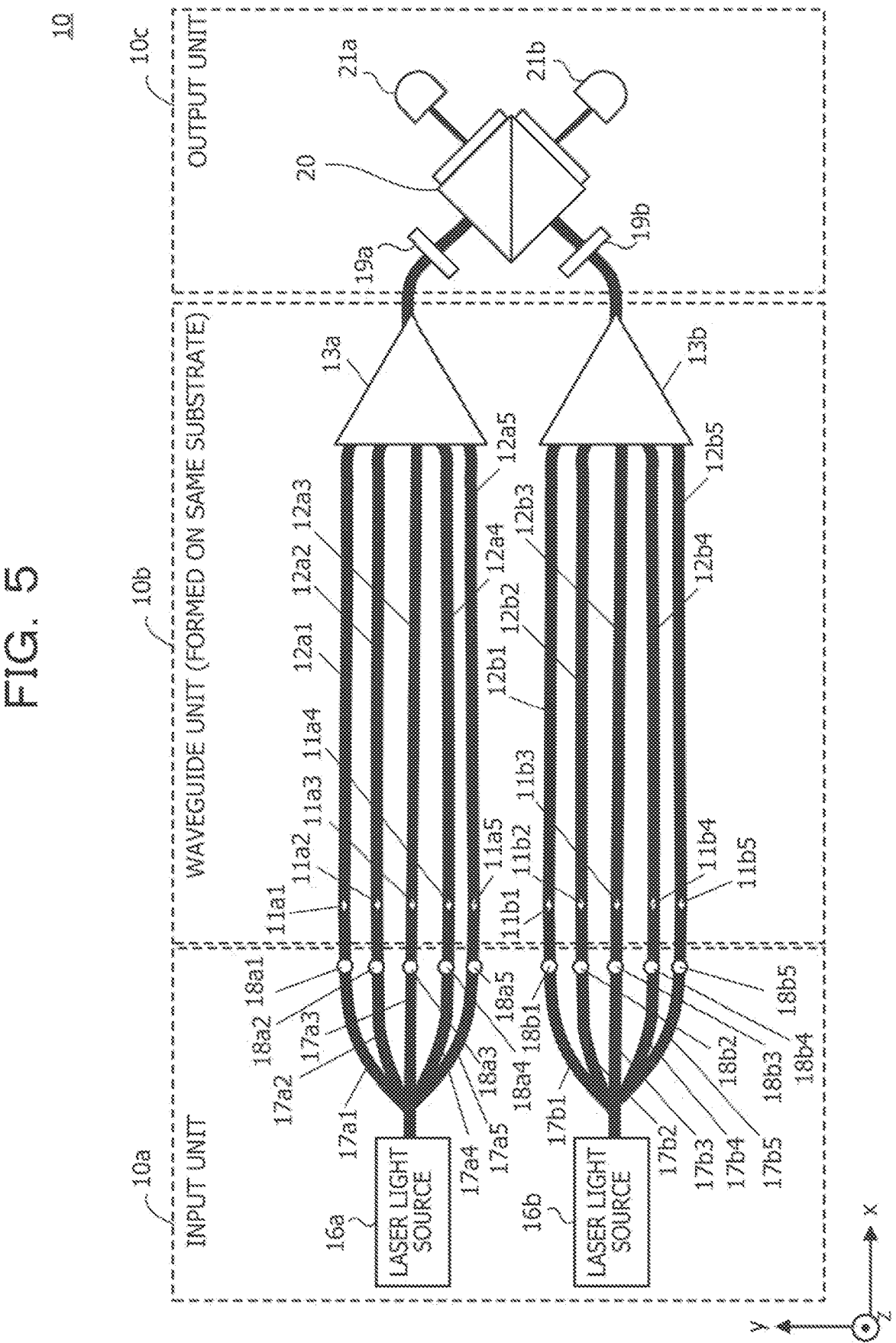
FIG. 5 is a top view illustrating an example of an overall structure of the quantum circuit of the first embodiment.

FIG. 5 is a top view illustrating an example of an overall structure of the quantum circuit of the first embodiment.

The quantum circuit 10 includes an input unit 10a, a waveguide unit 10b, and an output unit 10c.

Two unit structures illustrated in FIG. 1 are provided in the waveguide unit 10b. In other words, waveguide unit 10b has another unit structure in addition to the unit structure illustrated in FIG. 1. The another unit structure includes a plurality of optical waveguides 12b1, 12b2, 12b3, 12b4, and 12b5 formed in an array and each including a single-photon source (one of single-photon sources 11b1, 11b2, 11b3, 11b4, and 11b5 in FIG. 3) and a multiplexer 13b. Note that although illustration is omitted in FIG. 5, MW pulse signal generators and magnetic field generators are respectively arranged below the single-photon sources 11a1 to 11a5 and 11b1 to 11b5, similarly to FIG. 1.

The optical waveguides 12b1 to 12b5 and the multiplexer 13b of the waveguide unit 10b are formed on the semiconductor substrate 26 illustrated in FIG. 2, similarly to the optical waveguides 12a1 to 12a5 and the multiplexer 13a. Thereby, the waveguide unit 10b is implemented by one chip. Note that the input unit 10_a_ and the output unit 10_c_ may also be formed on the semiconductor substrate 26.

The input unit 10_a_ selects one of the single-photon sources 11_a_1 to 11_a_5 and one of the single-photon sources 11_b_1 to 11_b_5, and emits an optical pulse for resonant excitation (or initialization) to the selected single-photon source via the optical waveguide. The input unit 10_a_ has laser light sources 16_a_ and 16_b_ and optical waveguides 17_a_1, 17_a_2, 17_a_3, 17_a_4, 17_a_5, 17_b_1, 17_b_2, 17_b_3, 17_b_4, and 17_b_5. Moreover, the input unit 10_a_ has optical switches 18_a_1, 18_a_2, 18_a_3, 18_a_4, 18_a_5, 18_b_1, 18_b_2, 18_b_3, 18_b_4, and 18_b_5.

Each of the laser light sources 16_a_ and 16_b_ generates the optical pulse for resonant excitation in order to read out the above-described state. Moreover, each of the laser light sources 16_a_ and 16_b_ generates the optical pulse for initialization.

A center wavelength of the optical pulse for resonant excitation is adjusted to 637 nm corresponding to the above-described energy difference in the case of the NV center. The center wavelength of the optical pulse for initialization is adjusted to 532 nm in the case of the NV center. In the case where the optical pulse for initialization is given to the NV center, the state of the electron drops to the level of $m_s=0$ and is initialized to the state $|\uparrow>$ through relaxation process after excitation even at the level of $m_s=0$ or the level of $m_s=\pm1$.

The optical pulse generated by the laser light source 16_a_ is introduced into the optical waveguides 12_a_1 to 12_a_5 of the waveguide unit 10_b_ via the optical waveguides 17_a_1 to 17_a_5 and the optical switches 18_a_1 to 18_a_5. The optical pulse generated by the laser light source 16_b_ is introduced into optical waveguides 12_b_1 to 12_b_5 of the waveguide unit 10_b_ via the optical waveguides 17_b_1 to 17_b_5 and the optical switches 18_b_1 to 18_b_5.

For the optical switches 18_a_1 to 18_a_5 and 18_b_1 to 18_b_5, for example, EA modulators using an electro-absorption (EA) effect can be used. When a reverse bias voltage is applied to the EA modulator, the amount of light absorbed increases and no light is transmitted. Therefore, it is possible to switch whether to introduce the optical pulses generated by the laser light sources 16_a_ and 16_b_ into the optical waveguides 12_a_1 to 12_a_5 and 12_b_1 to 12_b_5 according to whether to apply the reverse bias voltage to the EA modulator.

Note that the input unit 10_a_ may be configured to emit the optical pulses in a z-axis direction in FIG. 5 from above the single-photon sources 11_a_1 to 11_a_5 and 11_b_1 to 11_b_5.

The output unit 10_c_ has filters 19_a_ and 19_b_, a beam splitter 20 that is an example of a branching element, and detectors 21_a_ and 21_b_.

The light output from the multiplexer 13_a_ is introduced into the beam splitter 20 through the filter 19_a_, and the light output from the multiplexer 13_b_ is respectively introduced into the beam splitter 20 through the filter 19_b_.

Although the filters 19_a_ and 19_b_ may be omitted in some cases, it is desirable to provide the filters in order to remove light outside a resonant light wavelength range from the light output from the multiplexers 13_a_ and 13_b_.

Note that, in a case of using the color center (with a spin quantum number of s=½) using silicon, germanium, tin, or lead as an impurity, relaxation luminescence between the excitation level and the ground level due to optical excitation has different wavelength components depending on the level of the ground state in which the electron is present. The wavelength difference between these wavelength components is generally smaller than energy resolution of the detectors 21_a_ and 21_b_, making discrimination difficult. It is desirable to provide the filters 19_a_ and 19_b_ to remove one of the wavelength components in order to discriminate the state of the electron (the presence or absence of luminescence) in a similar manner to the NV center.

In the case of using the color center using silicon, germanium, tin, or lead as an impurity, the relaxation luminescence via phonons can be suppressed even at room temperature and thus operation performance at the room temperature is higher than a case of using the color center using nitrogen as an impurity.

For example, a Fabry-Perot interferometer or the like can be used as the filters 19_a_ and 19_b_.

The beam splitter 20 introduces the photons condensed by the multiplexer 13_a_ and the photons condensed by the multiplexer 13_b_, and splits the photons in a first direction or a second direction. In the beam splitter 20, the first direction and the second direction are orthogonal, and probabilities of branching into the first direction and into the second direction are both 50% (50:50 orthogonal configuration), respectively. The beam splitter 20 is, for example, a half mirror that divides the amount of transmitted light and the amount of reflected light approximately 1:1. The photons introduced from the multiplexer 13_a_ strike one surface of the half mirror and are reflected or transmitted, and the photons introduced from the multiplexer 13_b_ strike another surface of the half mirror and are reflected or transmitted.

The detector 21_a_ detects the photons that are incident from one surface of the half mirror and are reflected, or the photons that are incident from the other surface of the half mirror and are transmitted. The detector 21_b_ detects the photons that are incident from the other surface of the half mirror and are reflected, or the photons that are incident from one surface of the half mirror and are transmitted. As the detectors 21_a_ and 21_b_, for example, single photon avalanche photo detectors (SPADs) or superconducting nanowire single photon detector (SNSPDs), which are single-photon detectors, can be used.

In the quantum circuit 10 as illustrated in FIG. 5, the photon propagated through any of the optical waveguides 12_a_1 to 12_a_5 and the photon propagated through any of the optical waveguides 12_b_1 to 12_b_5 merge at the beam splitter 20, resulting in formation of two-photon correlation. This allows formation of entanglement between different color centers indirectly via photons.

Figure 6:
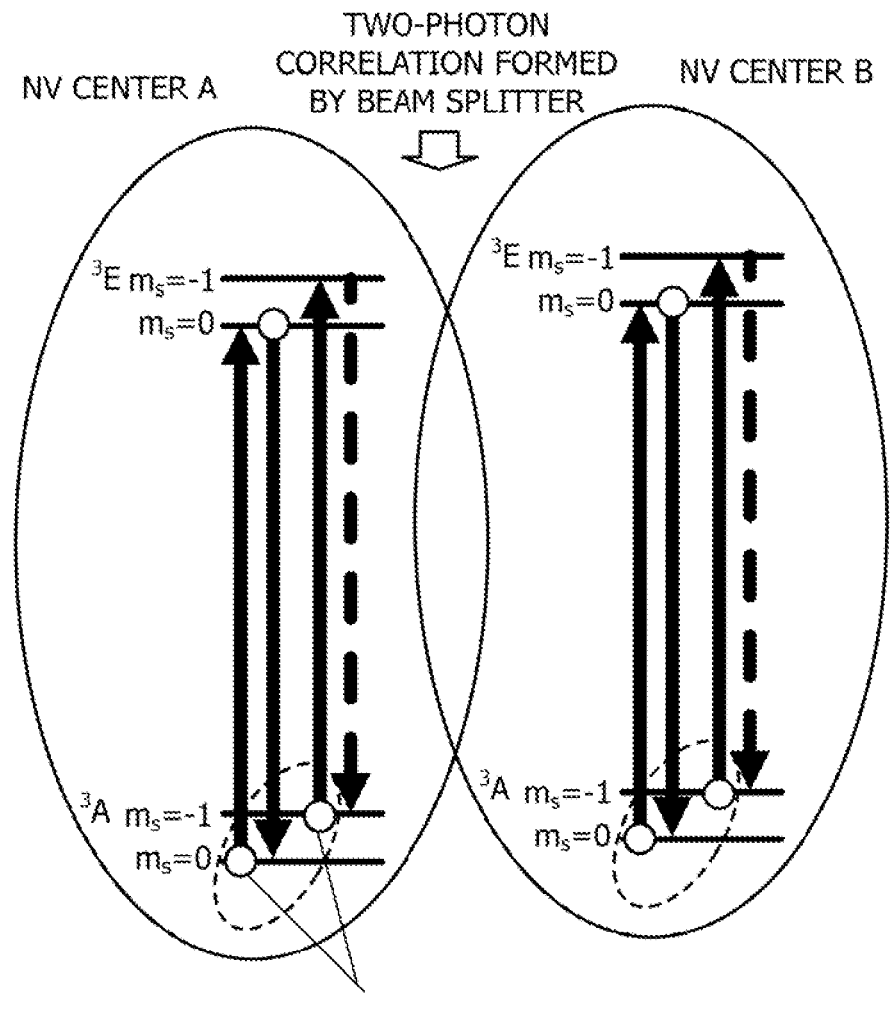
FIG. 6 is a diagram illustrating formation of entanglement between color centers.

FIG. 6 is a diagram illustrating formation of entanglement between color centers.

FIG. 6 illustrates an example using the NV center as the color center. An NV center A is the NV center included in any of the single-photon sources 11_a_1 to 11_a_5 in FIG. 5, and an NV center B is the NV center included in any of the single-photon sources 11_b_1 to 11_b_5 in FIG. 5.

A microwave pulse signal as described above is given, and the NV centers A and B are respectively in the superposed state of $|\uparrow>$ and $|\downarrow>$. In this state, when the optical pulses with the center wavelength of 637 nm generated by the laser light sources 16_a_ and 16_b_ are applied to the NV centers A and B, the two-photon correlation is formed by the beam splitter 20. Thereby, two qubits by the NV centers A and B indirectly become in an entangled state. This operation corresponds to an operation of a controlled-NOT gate, which is one of quantum gate operations.

In the quantum circuit 10 as described above, the optical waveguides 12_a_1 to 12_a_5 and 12_b_1 to 12_b_5 including the single-photon sources 11_a_1 to 11_a_5 and 11_b_1 to 11_b_5 are arranged in an array on the same substrate, and the multiplexers 13_a_ and 13_b_ that condense the photons propagated through each of the optical waveguides are provided. Thereby, a large number of single-photon sources (the color centers in the above example) that function as qubits can be integrated, so a large-scale quantum computer can be implemented. Note that a propagation loss can be reduced compared to a case of propagating photons using a free-space optical system by propagating photons using the optical waveguides $12a1$ to $12a5$ and $12b1$ to $12b5$, so high detection efficiency can be expected.

Furthermore, in the example of FIG. 5, the entanglement can be generated with 5×5 combinations between the qubit by any of the single-photon sources $11a1$ to $11a5$ and the qubit by any of the single-photon sources $11b1$ to $11b5$, without restriction between adjacent qubits. The combinations can be further increased by the configuration of the multiplexers 13a and 13b, which will be described below. A structure that allows entanglement only between adjacent qubits needs an entanglement transfer process to form entanglement between non-adjacent qubits, but this process can be omitted in the above-described quantum circuit 10. Therefore, calculation cost can be significantly reduced.

Example of Multiplexer

Figure 7:
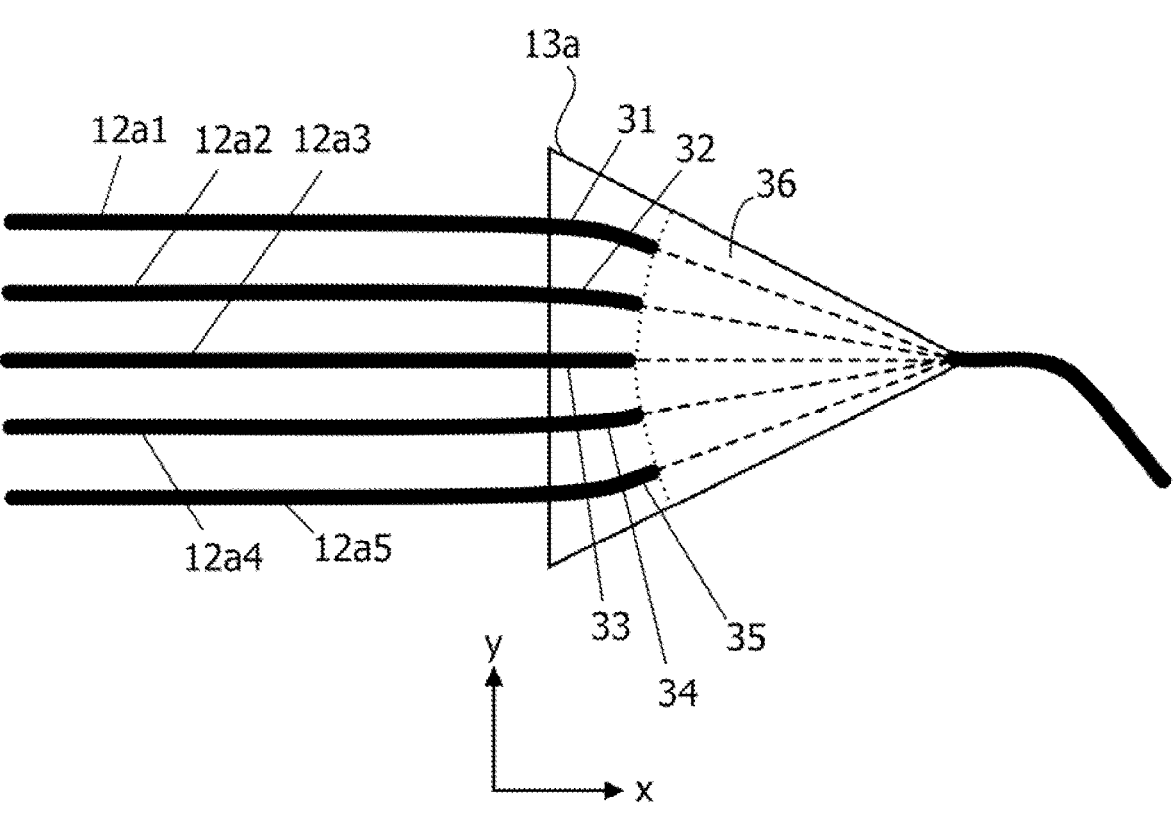
FIG. 7 is a view illustrating a first example of a multiplexer.

FIG. 7 is a view illustrating a first example of the multiplexer. Although FIG. 7 illustrates an example of the multiplexer 13a illustrated in FIG. 5, the multiplexer 13b can also have a similar configuration.

The multiplexer 13a has the optical waveguides 31, 32, 33, 34, and 35 formed on an array and coupled to the optical waveguides $12a1$ to $12a5$, and a fan-shaped planar waveguide 36 that guides the photons propagated through the optical waveguides 31 to 35 into an output terminal of the multiplexer 13a.

The optical waveguides 31 to 35 arranged outer side are bent more outwardly so that they are coupled at right angles to a circular arc of the planar waveguide 36. To compensate for an optical path difference between the optical waveguides $12a1$ to $12a5$ (between input ports of the multiplexer 13a) and to reduce a propagation loss due to reflection of photons in the optical waveguides 31 to 35, it is desirable to refract the photons incident from the optical waveguides $12a1$ to $12a5$ according to the degrees of bending of the optical waveguides 31 to 35.

Therefore, the optical waveguides 31 to 35 have a lower refractive index than the optical waveguides $12a1$ to $12a5$, and the optical waveguides 31 to 35 located closer to a center side have a higher refractive index. For example, in a case where the optical waveguides $12a1$ to $12a5$ are formed using aluminum nitride (AlN) (the refractive index: 2.2), the optical waveguides 31 to 35 are formed using silicon oxynitride (SiON) (the refractive index: 1.85). The refractive index of SiON can be changed by changing a composition ratio of oxygen and nitrogen. The refractive index approaches the refractive index of $SiO_2$=1.45 as the concentration of oxygen becomes higher. The refractive index approaches the refractive index of silicon nitride (SiN)=1.95 as the concentration of nitrogen becomes higher. The outer optical waveguides (for example, the optical waveguides 31 and 35, or the like), which are bent more and are set to have a lower refractive index, are formed with a higher concentration of oxygen, and the center-side optical waveguides (for example, the optical waveguide 33, or the like), which are set to have a higher refractive index, is formed with a higher concentration of nitrogen.

The fan-shaped planar waveguide 36 propagates the photons incident from the optical waveguides 31 to 35 coupled to the circular arc to the output terminal of the multiplexer 13a located at a central angle of the fan. The planar waveguide 36 is formed using, for example, SiON having a uniform composition.

For example, the number of ports can be at least 10 in a case where lengths of the multiplexer 13a in x-axis and y-axis directions in FIG. 7 are 30 μm, a waveguide diameter of the optical waveguides $12a1$ to $12a5$ is 0.5 μm, a waveguide interval is 3 μm, and an angle between adjacent optical paths at a central angle portion of the planar waveguide 36 is 5°. That is, five optical waveguides can be further added in addition to the five optical waveguides $12a1$ to $12a5$. In this case, the length of the waveguide unit 10b in the x-axis direction illustrated in FIG. 5 may be, for example, about 400 μm, and the length in the y-axis direction may be, for example, about 100 μm.

Thereby, 10×10=100 types of entanglement between color centers can be generated by two-photon correlation by photons respectively output from the multiplexers 13a and 13b by connecting ten optical waveguides to the multiplexers 13a and 13b, respectively.

Note that it is conceivable that the length of the waveguide unit 10b in the z-axis direction (the thickness of the structure in FIG. 2) is, for example, about 500 μm.

Figure 8:
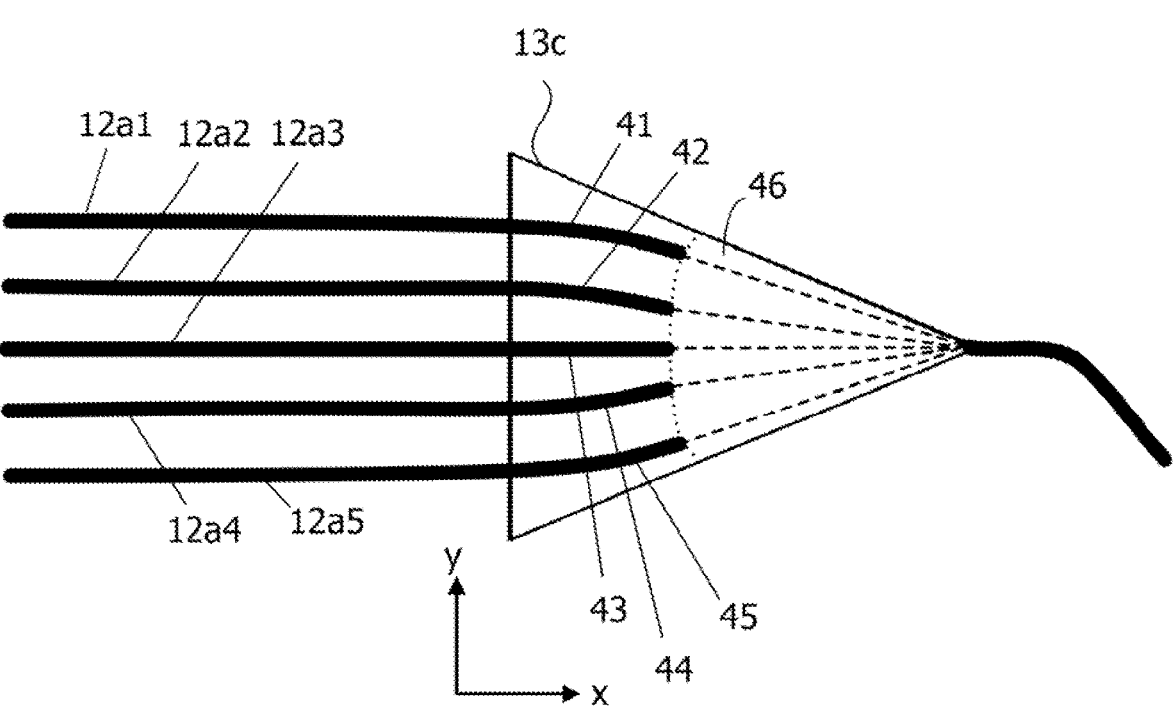
FIG. 8 is a view illustrating a second example of the multiplexer.

FIG. 8 is a view illustrating a second example of the multiplexer. Although FIG. 8 illustrates an example of a multiplexer 13c instead of the multiplexer 13a illustrated in FIG. 5, the multiplexer 13b can also have a similar configuration.

The multiplexer 13c illustrated in FIG. 8 also has optical waveguides 41, 42, 43, 44, and 45 formed on an array and coupled to the optical waveguides $12a1$ to $12a5$, and a fan-shaped planar waveguide 46, similarly to the multiplexer 13a illustrated in FIG. 7. Note that, unlike the multiplexer 13a, the multiplexer 13c has an acute triangular shape in which the length in the x-axis direction in FIG. 8 is longer than the length in the y-axis direction. Thereby, a bending curvature of the optical waveguides 41 to 45 can be moderated, and the loss at a connection portion to the planar waveguide 46 can be reduced.

Example of Method of Manufacturing Quantum Circuit

An example of a method of manufacturing the quantum circuit 10 will be described below.

Figure 9:
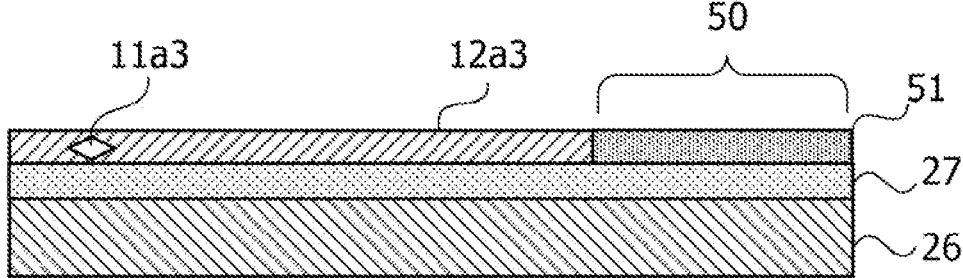
FIG. 9 is a cross-sectional view illustrating an example of a manufacturing process for an optical waveguide including a single-photon source.

FIG. 9 is a cross-sectional view illustrating an example of a manufacturing process for an optical waveguide including a single-photon source. Note that, in FIG. 9, illustration of the layer 25 illustrated in FIG. 2 in which the MW pulse signal generators $14a1$ to $14a5$ and the magnetic field generators $15a1$ to $15a5$ are formed is omitted.

The insulating layer 27 (for example, an $SiO_2$ film) is formed on the semiconductor substrate 26 (for example, a silicon substrate) by, for example, a chemical vapor deposition (CVD) method. Then, the optical waveguide $12a3$ including the single-photon source $11a3$ (and other optical waveguides of the waveguide unit 10b in FIG. 5) is formed on the insulating layer 27.

For example, the single-photon source $11a3$ using diamond containing the NV center can be formed by doping n-type impurities such as phosphorus (P) atoms during vapor phase growth of diamond by the CVD method. In the optical waveguide $12a3$, for example, AlN is used as a material for the thin wire waveguide portion that propagates the photons generated from the single-photon source $11a3$ to the multiplexer 13a. The thin wire waveguide portion is patterned using a photolithographic technique or an electron beam (EB) technique while masking a multiplexer forming area 50 with a mask material 51 In patterning, SiN having heat resistance is used as the mask material 51, for example.

Thereafter, the manufacturing process for the multiplexers 13*a* and 13*b* to be described below is performed.

FIGS. 10 to 19 are perspective views illustrating an example of a manufacturing process for the multiplexers. Hereinafter, an example of the method of manufacturing the multiplexer 13*a* illustrated in FIG. 7 will be described but the multiplexer 13*c* illustrated in FIG. 8 can also be manufactured by a similar method. Note that, in FIGS. 10 to 19, illustration of the optical waveguide 12*a*3 portion illustrated in FIG. 9 is omitted. When forming the multiplexers 13*a* and 13*b*, the forming area of the optical waveguide 12*a*3 (and other optical waveguides of the waveguide unit 10*b* in FIG. 5) is masked.

Figure 10:
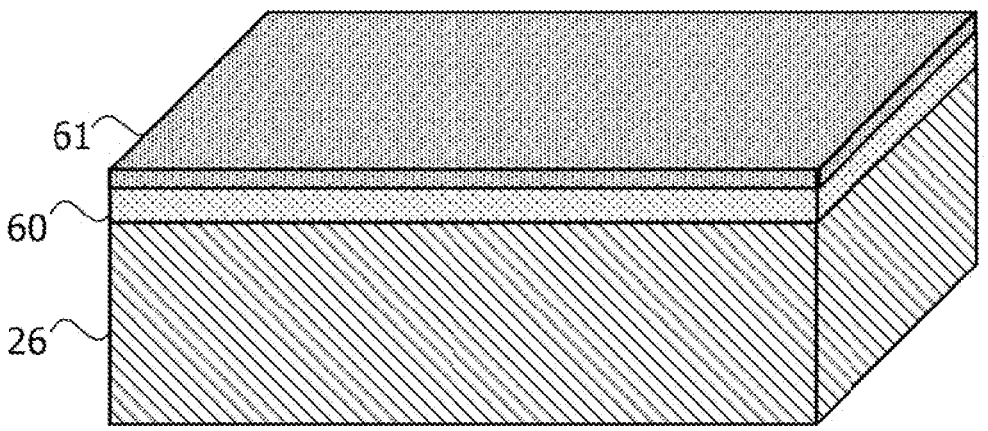
FIG. 10 is a perspective view illustrating an example of a manufacturing process for a multiplexer (part 1)

As illustrated in FIG. 10, an insulating layer 60 and a mask material 61 are deposited on the semiconductor substrate 26 by, for example, the CVD method. In the example illustrated below, it is assumed that $SiO_2$ is used as a base material of the optical waveguides 31 to 35 in FIG. 7, and an $SiO_2$ film is formed as the insulating layer 60. The insulating layer 60 is formed to have a thickness that matches the height of the already formed optical waveguides 12*a*1 to 12*a*5 and 12*b*1 to 12*b*5 after removing the insulating layer 27 illustrated in FIG. 9 once, for example.

Figure 11:
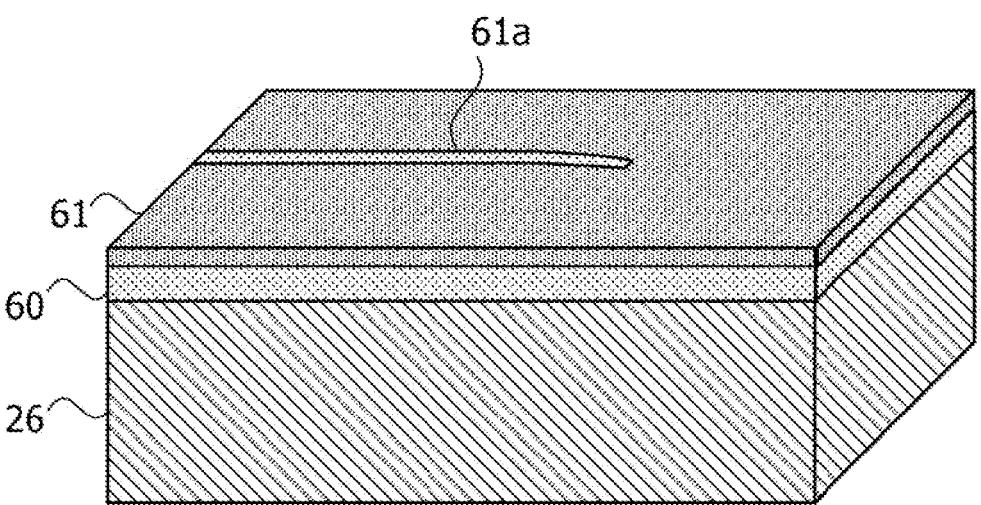
FIG. 11 is a perspective view illustrating an example of a manufacturing process for a multiplexer (part 2)

The optical waveguides 31 to 35 are manufactured separately for each concentration of oxygen (or nitrogen) introduced by thermal nitridation, for example. For example, first, the optical waveguide 33 with the highest nitrogen concentration is manufactured. In that case, an opening 61*a* is formed in the mask material 61 to expose a portion of the insulating layer 60 where the optical waveguide 33 is to be formed by patterning using the photolithographic technique or the EB technique (FIG. 11). Note that, in the patterning, the optical waveguide 33 to be formed is appropriately aligned so that the light from the optical waveguide 12*a*3 of the waveguide unit 10*b* is introduced. The same similarly applies to the patterning of the optical waveguides 31, 32, 34, 35 during manufacturing.

Figure 12:
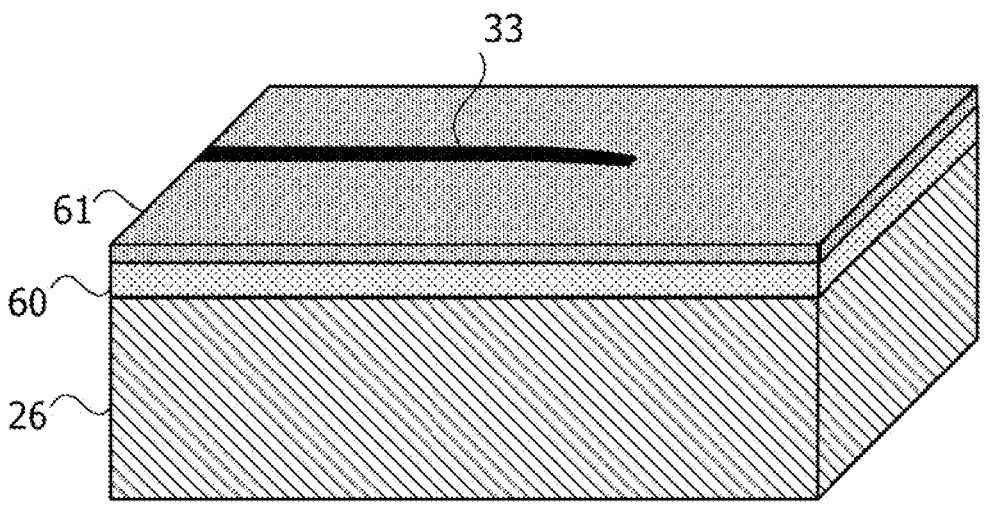
FIG. 12 is a perspective view illustrating an example of a manufacturing process for a multiplexer (part 3)
Figure 13:
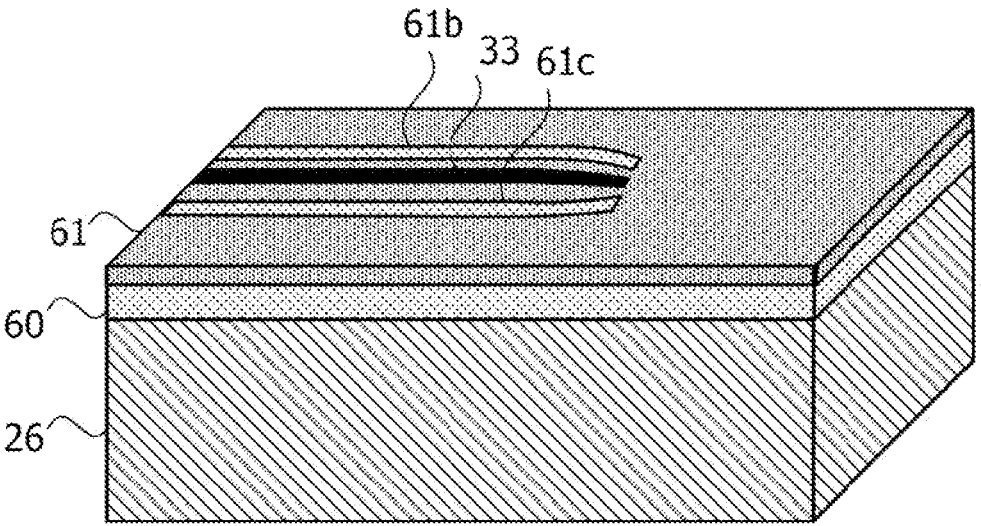
FIG. 13 is a perspective view illustrating an example of a manufacturing process for a multiplexer (part 4)

Then, the exposed portion of the insulating layer 60 is subjected to thermal nitridation to form the optical waveguide 33 (FIG. 12). The concentration of nitrogen to be mixed can be adjusted by adjusting a treatment temperature and a treatment time during the thermal nitridation, for example.

Figure 14:
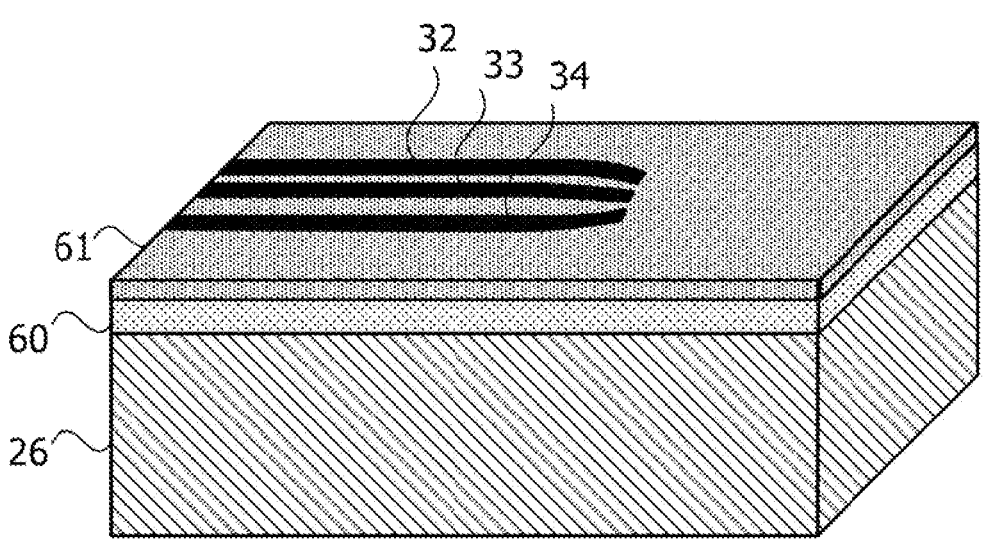
FIG. 14 is a perspective view illustrating an example of a manufacturing process for a multiplexer (part 5)
Figure 15:
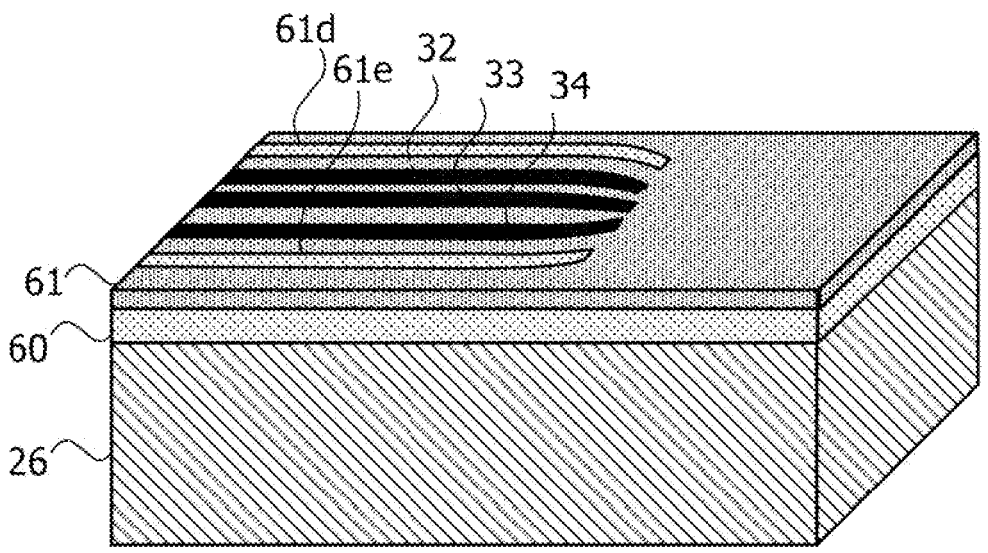
FIG. 15 is a perspective view illustrating an example of a manufacturing process for a multiplexer (part 6)

Next, openings 61*b* and 61*c* are formed in the mask material 61 by patterning for manufacturing the optical waveguides 32 and 34 with the second highest nitrogen concentration (FIG. 13), and the optical waveguides 32 and 34 are formed by thermal nitridation (FIG. 14).

Figure 16:
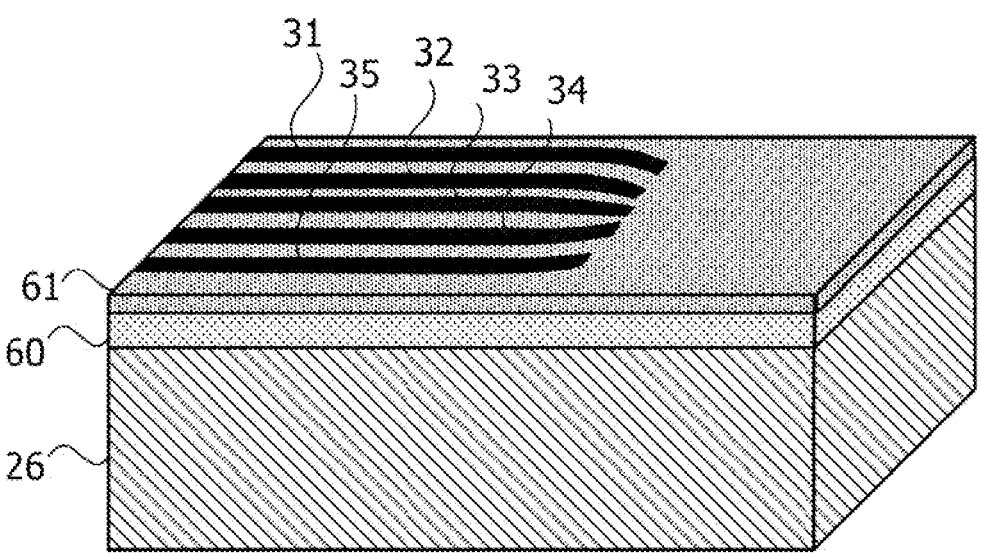
FIG. 16 is a perspective view illustrating an example of a manufacturing process for a multiplexer (part 7)
Figure 17:
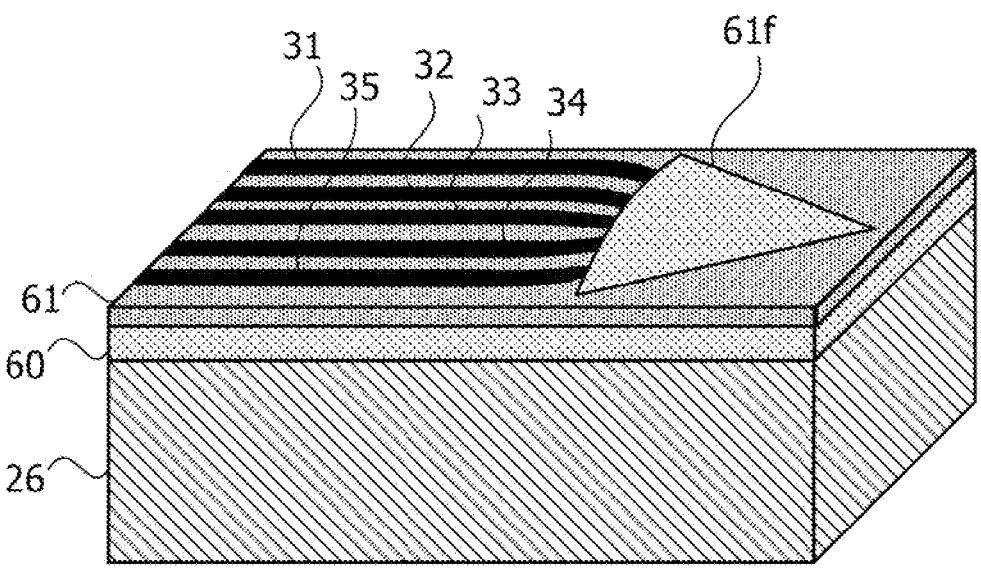
FIG. 17 is a perspective view illustrating an example of a manufacturing process for a multiplexer (part 8)

Thereafter, openings 61*d* and 61*e* are formed in the mask material 61 by patterning for manufacturing the optical waveguides 31 and 35 with the lowest nitrogen concentration (highest oxygen concentration) (FIG. 15), and the optical waveguides 31 and 35 are formed by thermal nitridation (FIG. 16).

Figure 18:
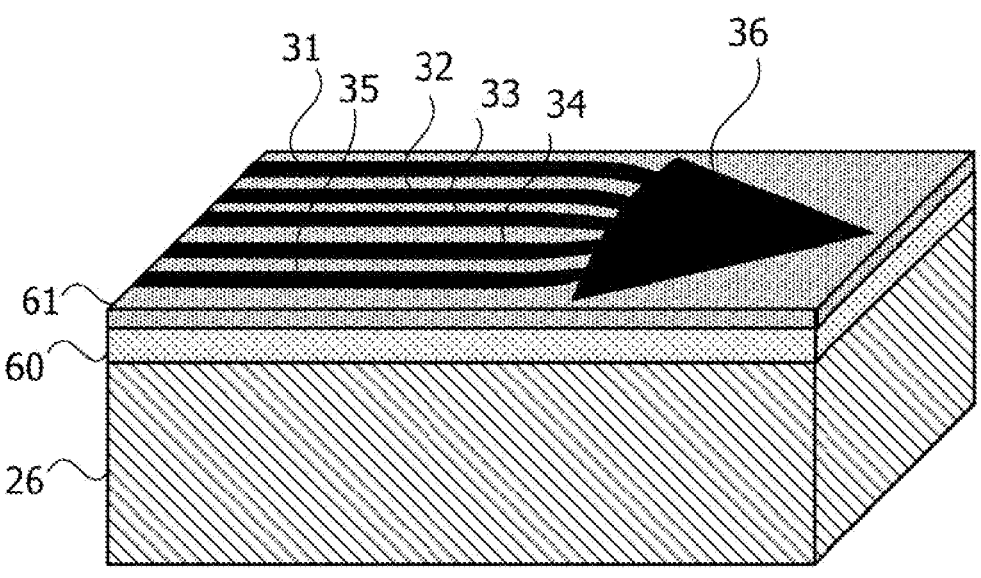
FIG. 18 is a perspective view illustrating an example of a manufacturing process for a multiplexer (part 9)

Then, an opening 61*f* is formed in the mask material 61 by patterning for manufacturing the planar waveguide 36 (FIG. 17), and the planar waveguide 36 is formed by thermal nitridation (FIG. 18).

Figure 19:
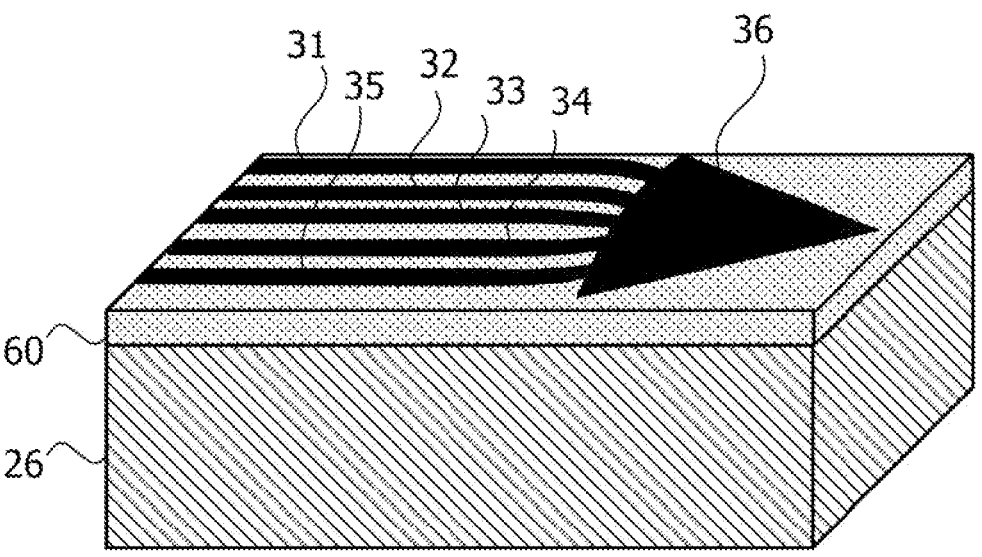
FIG. 19 is a perspective view illustrating an example of a manufacturing process for a multiplexer (part 10)

Thereafter, the mask material 61 is removed by wet treatment using hot phosphoric acid ($H_3PO_4$) or the like, for example, to complete the multiplexer 13*a* (FIG. 19).

(Polarization of Microwave and Laser for Optical Excitation)

Note that, for the microwave pulse signal used for the state operation of the color center described above, it is desirable to consider the direction (polarization) of an electric field vector with respect to the axial direction (orientation) of the color center and an application direction of the static magnetic field.

Figure 20:
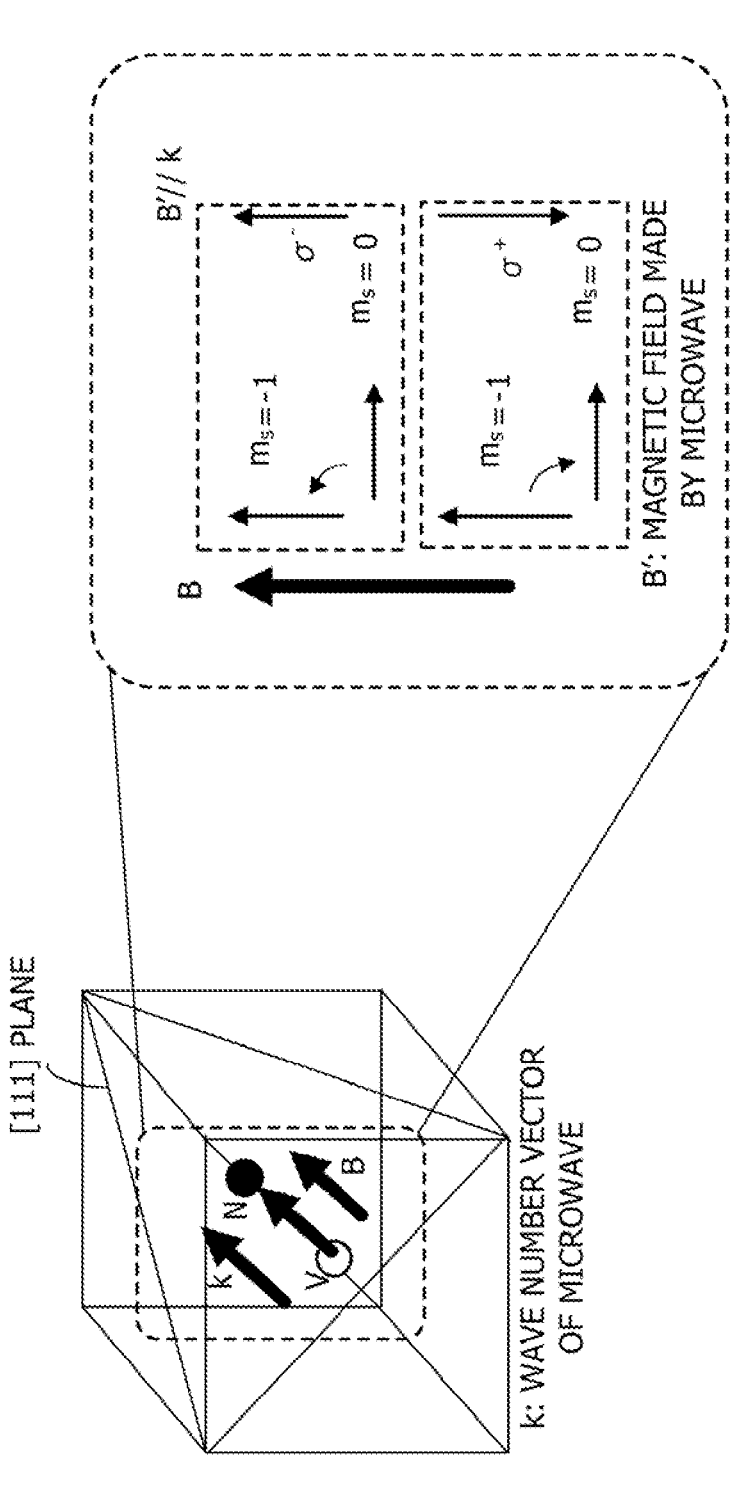
FIG. 20 is a diagram illustrating an example of an axial direction of the color center, a direction of a static magnetic field, and a direction of an electric field vector.

FIG. 20 is a diagram illustrating an example of the axial direction of the color center, the direction of the static magnetic field, and the direction of the electric field vector.

FIG. 20 illustrates an example in which the axial direction of the color center (NV center) is formed parallel to a [111] plane of diamond, and the application direction of the static magnetic field (B) is also parallel to the axial direction of the color center.

The (directions of) spins at the ground levels ($m_s$=0 and $m_s$=−1) of the color center to be operated are different. Therefore, to perform the state operation between $m_s$=0 and $m_s$=−1, a wave number vector k of the microwave pulse signal is set to be parallel to the axial direction of the NV center and the application direction of the static magnetic field B, and the electric field is set to have linear polarization ($\sigma^{\pm}$), according to the transition selection rule (the law of conservation of angular momentum). The same similarly applies to other color centers (spin quantum number s=½).

Furthermore, polarization is also taken into consideration for the laser for optical excitation as well. The ground level of the color center to be operated has a high linear polarization property in an optical transition (see, for example, FIG. 2 of Non-Patent Document 9 or the like). Therefore, it is important for the color center to adjust the polarization (linear polarization) of the laser to a direction in which absorption intensity and luminescence intensity associated with the absorption intensity can be increased. A half-wave plate or the like is used to adjust the polarization.

Example of Quantum Computer

Figure 21:
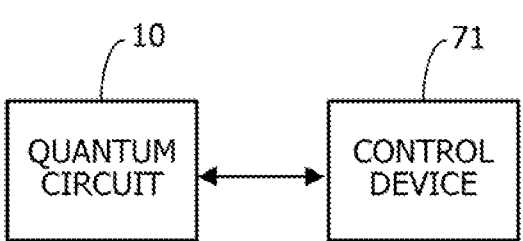
FIG. 21 is a diagram illustrating an example of a quantum computer.

FIG. 21 is a diagram illustrating an example of a quantum computer.

A quantum computer 70 has the quantum circuit 10 illustrated in FIG. 5 and a control device 71.

The control device 71 controls emission of the optical pulses from the laser light sources 16*a* and 16*b*, and performs processing based on the number of photons detected by the detectors 21*a* and 21*b*. More specifically, the control device 71 controls generation timing of the optical pulses of the laser by the laser light sources 16*a* and 16*b* of the quantum circuit 10, generation timing of the microwave pulse signals of the MW pulse signal generators (such as the MW pulse signal generators 14*a*1 to 14*a*5 in FIG. 1), and the like. Moreover, the control device 71 controls application timing of the magnetic field generators (such as the magnetic field generators 15*a*1 to 15*a*5 in FIG. 1) and the optical switches 18*a*1 to 18*a*5 and 18*b*1 to 18*b*5 in FIG. 5. The control device 71 may perform these controls based on the number of detected photons (the presence or absence of photons) depending on the type of quantum calculation to be calculated (for example, in a case of performing quantum teleportation or the like, which will be described below).

The control device 71 may include a processor that is hardware such as a central processing unit (CPU) or a digital signal processor (DSP). Furthermore, the control device 71 may include an electronic circuit for a special use, such as an application specific integrated circuit (ASIC) or a field programmable gate array (FPGA). Furthermore, the control device 71 may include a volatile memory such as a plurality of random access memories (RAMs) or a non-volatile memory such as a hard disk drive (HDD) or a flash memory. For example, the non-volatile memory stores a control program for controlling each part of the quantum circuit 10 according to the type of quantum calculation to be calculated. The control device 71 controls each part of the quantum circuit 10 and executes the quantum calculation by executing the control program.

Quantum Calculation Example

Figure 22:
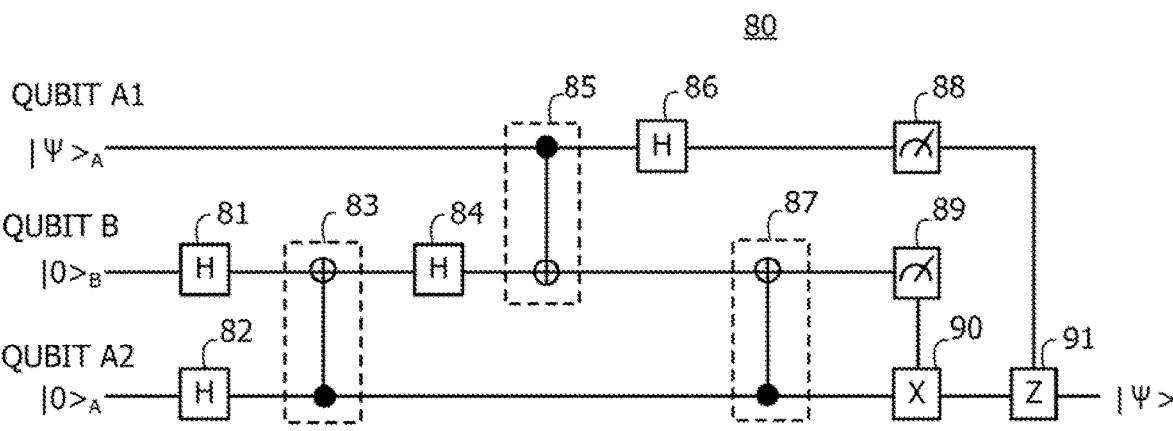
FIG. 22 is a diagram illustrating an example of quantum calculation.

FIG. 22 is a diagram illustrating an example of quantum calculation. FIG. 22 illustrates an example of a quantum teleportation circuit 80 that performs quantum teleportation, which is one type of quantum calculation.

The quantum teleportation circuit 80 performs quantum calculation to transfer a state $|\psi>_A$ to a distant location (to a different qubit) using the effect of the above-describe entanglement. The quantum teleportation circuit 80 has Hadamard gates 81, 82, 84, and 86, controlled-NOT gates 83, 85, and 87, measurement gates 88 and 89, a Pauli X gate 90, and a Pauli Z gate 91.

The quantum teleportation circuit 80 as described above can be implemented by using a total of three single-photon sources: two of the single-photon sources 11a1 to 11a5 and one of the single-photon sources 11b1 to 11b5 as qubits in the waveguide unit 10b illustrated in FIG. 5, for example. Hereinafter, a calculation procedure in the case of using the three qubits will be described, setting the qubit generated by the single-photon source 11a1 as qubit A1, the qubit generated by the single-photon source 11a2 as qubit A2, and the qubit generated by the single-photon source 11b1 as qubit B.

The state of qubit A1 is assumed to be $|\psi>_A$. $|\psi>_A$ is a linear combination of states $|0>$ and $|-1>$, and can be expressed as $c_0|0>+c_1|-1>$. $c_0$ and $c_1$ are predetermined coefficients.

First, the control device 71 causes the magnetic field generators to apply static magnetic fields to the qubits A1, A2, and B, respectively. Thereby, the degeneracy of the level of $m_s=\pm1$ is resolved, and the level is split into two levels of $m_s=-1$ and $m_s=+1$ (see FIG. 3).

Next, the control device 71 turns on the optical switches 18a2 and 18b1, turns off the other optical switches 18a1, 18a3 to 18a5, and 18b2 to 18b5, and causes the laser light sources 16a and 16b to generate the optical pulses for initialization. The center wavelength of the optical pulse for initialization is adjusted to 532 nm in the case of the NV center. By emitting the pulse signal for initialization, the states of the qubits A2 and B drop to the level of $m_s=0$ through the relaxation process after excitation and is initialized to the state $|\uparrow>\equiv|0>$ even in the case of the level of $m_s=0$ or the case of the level of $m_s=\pm1$. In FIG. 22, the initial state of qubit A2 is denoted by $|0>_A$, and the initial state of qubit B is denoted by $|0>_B$.

After that, the control device 71 causes the MW pulse signal generators provided in the qubits A2 and B to generate pulse signals ((n/2 pulses) pulses obtained by rotating the state vector of the qubit defined in a Bloch space around the x axis by 90°). Thereby, Hadamard gates 81 and 82 are operated (Hadamard transform) for the qubits A2 and B, and the qubits A2 and B are in a superposed state of the state $|0>$ and the state $|-1>$.

Moreover, the control device 71 causes the laser light sources 16a and 16b to generate the optical pulses for resonant excitation. The center wavelength of the optical pulse for resonant excitation is adjusted to 637 nm in the case of the NV center. The optical pulse for resonant excitation is emitted to the qubits A2 and B, and the beam splitter 20 operates the controlled-NOT gate 83. Thereby, the entanglement via photons is formed between the qubits A2 and B as described above.

Next, the control device 71 turns on the optical switches 18a1 and 18b1 and turns off the other optical switches 18a2 to 18a5 and 18b2 to 18b5. Then, the control device 71 causes the MW pulse signal generator provided for the qubit B to generate the pulse signal (n/2 pulse) again. Thereby, the Hadamard gate 84 is operated (Hadamard transform) for the qubit B, and the qubit B becomes in the superposed state of the state $|0>$ and the state $|-1>$ again.

Thereafter, the control device 71 causes the laser light sources 16a and 16b to generate the optical pulses for resonant excitation. The optical pulse for resonant excitation is emitted to the qubits A1 and B, and the beam splitter 20 operates the controlled-NOT gate 85. Thereby, the entanglement via photons is formed between the qubits A1 and B.

Then, the control device 71 causes the MW pulse signal generator provided for the qubit A1 to generate the pulse signal (n/2 pulse) again. Thereby, the Hadamard gate 86 is operated (Hadamard transform) for the qubit A1, and the qubit A1 becomes in the superposed state of state $|0>$ and state $|-1>$.

Thereafter, the control device 71 causes the laser light source 16a to generate the optical pulse for resonant excitation. The optical pulse is emitted to the qubit A1 after Hadamard transformation, and the state $|0>$ or $|-1>$ of the qubit A1 is detected as the presence or absence of photons by the detectors 21a and 21b. This operation is the operation of the measurement gate 88.

Next, the control device 71 turns on the optical switches 18a2 and 18b1 and turns off the other optical switches 18a1, 18a3 to 18a5, and 18b2 to 18b5 again. Then, the control device 71 causes the laser light sources 16a and 16b to generate the optical pulses for resonant excitation. The optical pulse for resonant excitation is emitted to the qubits A2 and B, and the beam splitter 20 operates the controlled-NOT gate 87. Thereby, the entanglement via photons is formed between the qubits A2 and B.

Thereafter, the control device 71 stops the generation of the optical pulses by the laser light source 16a of the laser light sources 16a and 16b, and detects the state $|0>$ or $|-1>$ of the qubit B as the presence or absence of photons by the detectors 21a and 21b. This operation is the operation of the measurement gate 89.

Then, the control device 71 stops the generation of the optical pulses by the laser light source 16b, and causes the MW pulse signal generator provided for the qubit A2 to operate the Pauli X gate 90 or the Pauli Z gate 91 based on the detection results by the measurement gates 88 and 89.

In a case where the detection result is $|00>$ (in a case where the detection results by the measurement gates 88 and 89 are both in the state $|0>$), the control device 71 causes the MW pulse signal generator to operate neither the Pauli X gate 90 nor the Pauli Z gate 91. In a case where the detection result is $|0-1>$ (in a case where the detection result by the measurement gate 88 is the state $|0>$ and the detection result by the measurement gate 89 is the state $|-1>$), the control device 71 causes the MW pulse signal generator to operate the Pauli X gate 90. The operation of the Pauli X gate 90 is an operation to cause the MW pulse signal generator provided for the qubit A2 to generate ±n pulses. In a case where the detection result is $|-10>$ (in a case where the detection result by the measurement gate 88 is the state $|-1>$ and the detection result by the measurement gate 89 is the state $|0>$), the control device 71 causes the MW pulse signal generator to operate the Pauli Z gate 91 without allowing execution of the operation of the Pauli X gate 90. The operation of the Pauli Z-gate 91 is an operation to cause the MW pulse signal generator provided for the qubit A2 to generate ±2n pulses. In a case where the detection result is |−1-1> (both the detection results by the measurement gates 88 and 89 are the state |−1>), the control device 71 causes the MW pulse signal generator to operate both the Pauli X gate 90 and the Pauli Z gate 91.

Thereby, the state $|\psi>_A$ of the qubit A1 is transferred to the qubit A2.

As described above, the quantum teleportation is implemented using the quantum circuit 10 illustrated in FIG. 5.

Second Embodiment

Figure 23:
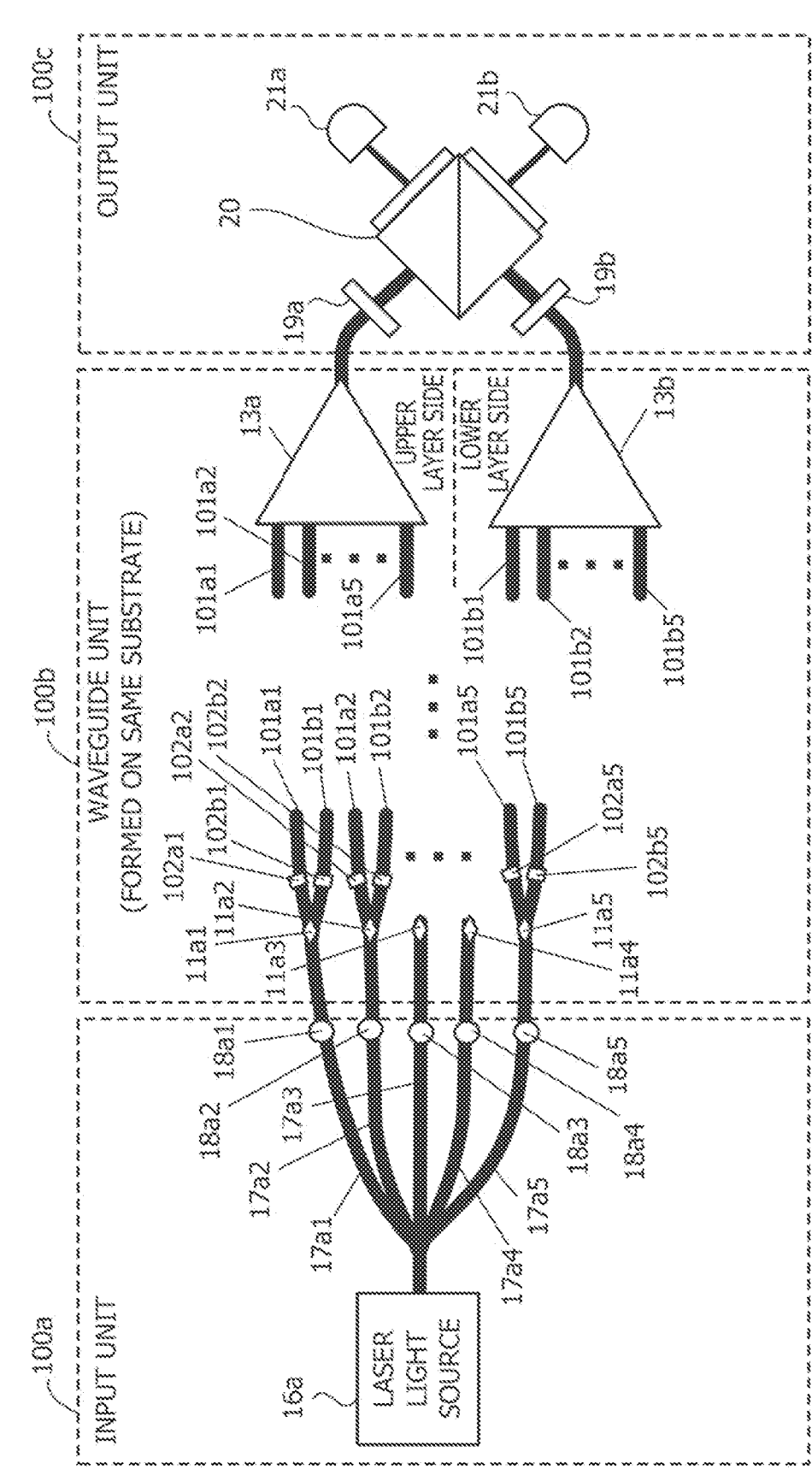
FIG. 23 is a diagram illustrating an example of a quantum circuit according to a second embodiment.

FIG. 23 is a diagram illustrating an example of a quantum circuit according to a second embodiment. In FIG. 23, elements same as the elements of the quantum circuit 10 illustrated in FIG. 5 are denoted by the same reference signs.

A quantum circuit 100 of the second embodiment includes an input unit 100a, a waveguide unit 100b, and an output unit 100c. Note that, in FIG. 23, illustration of MW pulse signal generators and magnetic field generators is omitted.

Unlike the input unit 10a of the quantum circuit 10 illustrated in FIG. 5, the input unit 100a does not have a configuration for supplying optical pulses to single-photon sources 11b1 to 11b5 illustrated in FIG. 5.

In the waveguide unit 100b, photons generated from the respective single-photon sources blab to 11a5 are propagated to a multiplexer 13a or a multiplexer 13b through one of optical waveguides formed in two different layers. In other words, each of a plurality of optical waveguides coupled to the multiplexer 13a shares the single-photon source with one of a plurality of optical waveguides coupled to the multiplexer 13b.

For example, the optical waveguides 101a1, 101a2, . . . , and 101a5 in FIG. 23 are formed in the upper layer-side layer and are coupled to the multiplexer 13a formed on the layer. The optical waveguides 101b1, 101b2, . . . , and 101b5 in FIG. 23 are formed in the lower layer-side layer and are coupled to the multiplexer 13b formed on the layer.

Furthermore, EO modulators 102a1, 102a2, . . . , 102a5, and 102b1, 102b2, . . . , 102b5, which are modulators using an electro-optic (EO) effect, are provided in the optical waveguides 101a1 to 101a5, and 101b1 to 101b5.

The EO modulators 102a1 to 102a5 and 102b1 to 102b5 have a function of optical switches, and can switch which of the optical waveguides in the upper layer or the lower layer to use (whether to propagate the photons to the multiplexer 13a or 13b) under the control of the control device 71. Moreover, the EO modulators 102a1 to 102a5 and 102b1 to 102b5 have an advantage of less loss when a refractive index changes. Furthermore, the EO modulators 102a1 to 102a5 and 102b1 to 102b5 have a function to smooth branching to the upper layer and lower layer of the optical waveguides to increase or decrease only a real part of the refractive index.

Note that an optical switch other than the EO modulator may be used.

The configuration of the output unit 100c is the same as the configuration of the output unit 10c in FIG. 5.

According to the quantum circuit 100 of the second embodiment, effects similar to those of the quantum circuit 10 of the first embodiment can be obtained, and entanglement can be formed between qubits by adjacent color centers.

For example, consider a case where optical pulses for resonant excitation are emitted to the single-photon sources

11a1 and 11a2, and the optical switches by the EO modulators 102a1 and 102b2 are turned on and the optical switches by the EO modulators 102b1 and 102a2 are turned off under the control of the control device 71. In this case, the photons generated by the single-photon source 11a1 are propagated through the optical waveguide 101a1 in the upper layer and the multiplexer 13a and are introduced into a beam splitter 20 via a filter 19a. Meanwhile, the photons generated by the single-photon source 11a2 are propagated through the optical waveguide 101b2 in the lower layer and the multiplexer 13b and are introduced into the beam splitter 20 via a filter 19b. Thereby, entanglement is formed between qubits of adjacent color centers contained in the single-photon sources 11a1 and 11a2 via the photons.

Third Embodiment

Figure 24:
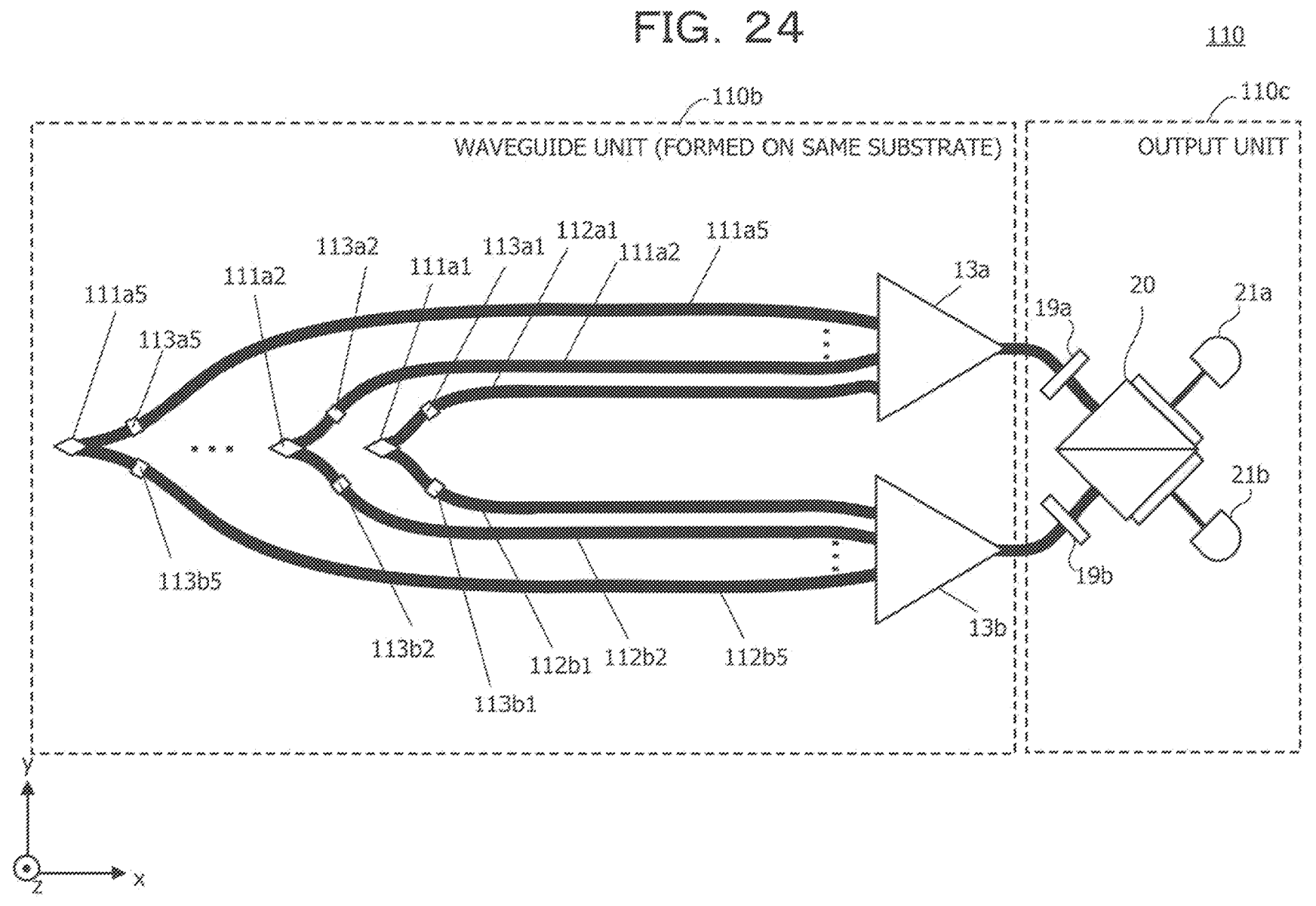

FIG. 24 is a diagram illustrating an example of a quantum circuit according to a third embodiment. In FIG. 24, elements same as the elements of the quantum circuit 10 illustrated in FIG. 5 are denoted by the same reference signs.

A quantum circuit 110 of the third embodiment includes a waveguide unit 100b and an output unit 100c. Note that, in FIG. 24, illustration of MW pulse signal generators and magnetic field generators is omitted. These elements are arranged below respective single-photon sources 111a1, 111a2, . . . , and 111a5, for example.

An input unit for selecting one of the single-photon sources 111a1 to 111a5 and emitting an optical pulse for resonant excitation (or for initialization) to the selected single-photon source is also not illustrated. In the quantum circuit 110 of the third embodiment, the optical pulses are emitted in a z-axis direction in FIG. 24 from above to the single-photon sources 111a1 to 111a5.

In the waveguide unit 100b, photons generated from each of the single-photon sources 111a1 to 111a5 are propagated through either of two different optical waveguides formed in the same layer (same plane) to a multiplexer 13a or a multiplexer 13b. In other words, the quantum circuit 110 has a configuration in which each of optical waveguides 112a1, 112a2, . . . , and 112a5 coupled to the multiplexer 13a shares the single-photon source with one of optical waveguides 112b1, 112b2, . . . , and 112b5 coupled to the multiplexer 13b.

Furthermore, the optical waveguides 112a1 to 112a5, and 112b1 to 112b5 are provided with EO modulators 113a1, 113a2, . . . , 113a5, and 113b1, 113b2, . . . , 113b5 that function as optical switches as described above. Note that an optical switch other than the EO modulator may be used.

The configuration of the output unit 100c is the same as the configuration of the output unit 10c in FIG. 5.

According to the quantum circuit 110 of the third embodiment, effects similar to those of the quantum circuit 10 of the first embodiment can be obtained, and entanglement can be formed between qubits by adjacent color centers.

For example, consider a case where optical pulses for resonant excitation are emitted to the single-photon sources 111a1 and 111a2, and the optical switches by the EO modulators 113a1 and 113b2 are turned on and the optical switches by the EO modulators 113b1 and 113a2 are turned off under the control of the control device 71. In this case, the photons generated by the single-photon source 111a1 are propagated through the optical waveguide 112a1 and the multiplexer 13a and are introduced into a beam splitter 20 via a filter 19a. Meanwhile, the photons generated by the single-photon source 111a2 are propagated through the optical waveguide 112b2 and the multiplexer 13b and are introduced into the beam splitter 20 via a filter 19*b*. Thereby, entanglement is formed between qubits of adjacent color centers contained in the single-photon sources 111*a*1 and 111*a*2 via the photons.

Furthermore, unlike the quantum circuit 100 of the second embodiment, the quantum circuit 110 forms the optical waveguides in the same layer (same plane), and thus can be manufactured by a relatively easy manufacturing process.

The above description merely indicates the principle of the present invention. Moreover, numerous modifications and changes can be made by those skilled in the art. The present invention is not limited to the exact configuration and application examples illustrated and described above, and all corresponding modifications and equivalents are regarded within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A quantum circuit comprising:
   a plurality of first optical waveguides formed on a substrate and each of which includes a single-photon source;
   a plurality of second optical waveguides formed on a substrate and each of which includes a single-photon source;
   a first multiplexer formed on the substrate and configured to condense first photons propagated through the plurality of first optical waveguides;
   a second multiplexer formed on the substrate and configured to condense second photons propagated through the plurality of second optical waveguides;
   a branching element configured to introduce the first photons condensed by the first multiplexer and the second photons condensed by the second multiplexer and branch the first photons and the second photons in a first direction and a second direction;
   a first detector configured to detect the first photons and the second photons branched in the first direction; and
   a second detector configured to detect the first photons and the second photons branched in the second direction.

2. The quantum circuit according to claim 1, wherein the single-photon source includes a complex defect formed by an impurity atom in a diamond single crystal and a vacancy adjacent to the impurity atom.

3. The quantum circuit according to claim 2, wherein the impurity atom is at least one selected from nitrogen (N), silicon (Si), germanium (Ge), tin (Sn), and lead (Pb).

4. The quantum circuit according to claim 2, wherein the complex defect functions as one qubit,
   the complex defect has an electronic spin state and a nuclear spin state that are coupled to each other, and
   the complex defect includes, among a plurality of quantum levels in the electronic spin state and the nuclear spin state, two levels of two series in which an energy difference between the levels is smaller than an energy line width of a laser to be emitted to the single-photon source, and the levels are close to an extent that the levels are able to be resonantly excited by the laser.

5. The quantum circuit according to claim 1, further comprising:
   a microwave pulse signal generator configured to individually apply a microwave pulse signal to each of the single-photon sources included in the plurality of first optical waveguides and the plurality of second optical waveguides; and
   a magnetic field generator configured to apply a static magnetic field to the single-photon sources included in the plurality of first optical waveguides and the plurality of second optical waveguides.

6. The quantum circuit according to claim 1, wherein the first multiplexer includes:
   a plurality of third optical waveguides coupled to the plurality of first optical waveguides; and
   a first planar waveguide that guides the first photons and the second photons propagated through the plurality of third optical waveguides to an output terminal of the first multiplexer, and
   the second multiplexer includes:
   a plurality of fourth optical waveguides coupled to the plurality of second optical waveguides; and
   a second planar waveguide that guides the first photons and the second photons propagated through the plurality of fourth optical waveguides to an output terminal of the second multiplexer.

7. The quantum circuit according to claim 6, wherein the plurality of third optical waveguides has a lower refractive index than the plurality of first optical waveguides,
   the plurality of fourth optical waveguides has a lower refractive index than the plurality of second optical waveguides,
   an optical waveguide arranged closer to a center side has a higher refractive index among the plurality of third optical waveguides, and
   an optical waveguide arranged closer to a center side has a higher refractive index among the plurality of fourth optical waveguides.

8. The quantum circuit according to claim 7, wherein the plurality of first optical waveguides and the plurality of second optical waveguides are formed with aluminum nitride,
   the plurality of third optical waveguides, the plurality of fourth optical waveguides, the first planar waveguide, and the second planar waveguide are formed with silicon oxynitride,
   the optical waveguide arranged closer to the center side has a higher concentration of nitrogen and the optical waveguide arranged closer to an outer side has a higher concentration of oxygen among the plurality of third optical waveguides, and
   the optical waveguide arranged closer to the center side has a higher concentration of nitrogen and the optical waveguide arranged closer to an outer side has a higher concentration of oxygen among the plurality of fourth optical waveguides.

9. The quantum circuit according to claim 1, wherein each of the plurality of first optical waveguides shares the single-photon source with one of the plurality of second optical waveguides, and
   each of the plurality of first optical waveguides and the plurality of second optical waveguides has an optical switch that switches whether to propagate the first photons and the second photons to the first multiplexer or the second multiplexer.

10. The quantum circuit according to claim 1, wherein the first detector and the second detector are single-photon detectors.

11. The quantum circuit according to claim 1, further comprising:

an input unit configured to:

select one of the single-photon sources respectively included in the plurality of first optical waveguides, select one of the single-photon sources respectively included in the plurality of second optical waveguides, and emit an optical pulse to the selected single-photon sources.

12. The quantum circuit according to claim 1, wherein, in the branching element, the first direction and the second direction are orthogonal to each other, and a probability of branching in the first direction and the second direction is 50%.

13. A quantum computer comprising:

a quantum circuit that includes:

a plurality of first optical waveguides formed on a substrate and each of which includes a single-photon source;

a plurality of second optical waveguides formed on a substrate and each of which includes a single-photon source;

a first multiplexer formed on the substrate and configured to condense first photons propagated through the plurality of first optical waveguides;

a second multiplexer formed on the substrate and configured to condense second photons propagated through the plurality of second optical waveguides;

a branching element configured to introduce the first photons condensed by the first multiplexer and the second photons condensed by the second multiplexer and branch the first photons and the second photons in a first direction and a second direction;

a first detector configured to detect the first photons and the second photons branched in the first direction; and a second detector configured to detect the first photons and the second photons branched in the second direction; and an input unit configured to select one of the single-photon sources respectively included in the plurality of first optical waveguides and one of the single-photon sources respectively included in the plurality of second optical waveguides, and emit an optical pulse to the selected single-photon sources; and a control device configured to control emission of the optical pulse.

* * * * *